United States Patent
Ziemann

(10) Patent No.: US 9,064,339 B2
(45) Date of Patent: Jun. 23, 2015

(54) COMPUTER IMPLEMENTED SYSTEMS AND METHODS FOR PROVIDING A MOBILE SOCIAL ENTERPRISE INTERFACE

(75) Inventor: Tyler A. Ziemann, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/445,666

(22) Filed: Apr. 12, 2012

(65) Prior Publication Data

US 2013/0007049 A1    Jan. 3, 2013

Related U.S. Application Data

(60) Provisional application No. 61/502,053, filed on Jun. 28, 2011.

(51) Int. Cl.
  *G06F 17/30* (2006.01)
  *G06T 11/20* (2006.01)
(52) U.S. Cl.
  CPC ...................................... *G06T 11/20* (2013.01)
(58) Field of Classification Search
  USPC ......................................................... 707/769
  See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |

(Continued)

OTHER PUBLICATIONS

U.S. Office Action dated Dec. 7, 2012 issued in U.S. Appl. No. 12/445,648.

(Continued)

*Primary Examiner* — Robert Beausoliel, Jr.
*Assistant Examiner* — Hau H Hoang
(74) *Attorney, Agent, or Firm* — Weaver Austin Villeneuve & Sampson LLP

(57) ABSTRACT

Disclosed are systems, apparatus, and methods for updating and visualizing information stored in a database system. In various implementations, a request to search contact data is received, where the contact data provides contact information associated with at least one entity. Search parameters may be retrieved responsive to the search request, where the search parameters define the search and include a geographical location associated with a source of the request. In various implementations, a first contact is identified based on the retrieved search parameters, where the first contact is identified based at least in part on a geographical distance between the first contact and the source of the request. In some implementations, a geographical representation of the first contact is generated, where the geographical representation indicates a geographical location of the first contact, and where the geographical representation is capable of being displayed at a user interface of a computer system.

24 Claims, 24 Drawing Sheets

(56) References Cited

U.S. PATENT DOCUMENTS

| | | | |
|---|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,851,004 B2 | 12/2010 | Hirao et al. |
| 7,853,622 B1 | 12/2010 | Baluja et al. |
| 7,853,881 B1 | 12/2010 | Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,566,328 B2 * | 10/2013 | Tseng et al. ................. 707/748 |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0155750 A1 * | 7/2006 | Fowler et al. ................. 707/102 |
| 2008/0005064 A1 | 1/2008 | Sarukkai |

(56) References Cited

U.S. PATENT DOCUMENTS

| | | |
|---|---|---|
| 2008/0235242 A1 | 9/2008 | Swanburg et al. |
| 2008/0249972 A1 | 10/2008 | Dillon |
| 2009/0005021 A1* | 1/2009 | Forstall et al. ............. 455/414.3 |
| 2009/0005981 A1* | 1/2009 | Forstall et al. ................ 701/211 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0204408 A1* | 8/2009 | Simpson et al. .............. 704/273 |
| 2010/0088636 A1* | 4/2010 | Yerkes et al. ................. 715/809 |
| 2010/0184416 A1* | 7/2010 | Gupta et al. ............. 455/414.3 |
| 2011/0167058 A1* | 7/2011 | van Os .......................... 707/722 |
| 2011/0302630 A1* | 12/2011 | Nair et al. .......................... 726/4 |
| 2012/0158744 A1 | 6/2012 | Tseng et al. |
| 2012/0233137 A1 | 9/2012 | Jakobson et al. |
| 2012/0290407 A1 | 11/2012 | Hubbard et al. |
| 2013/0002676 A1 | 1/2013 | Ziemann |
| 2013/0007029 A1 | 1/2013 | Ziemann |
| 2013/0007126 A1 | 1/2013 | Ziemann |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |

OTHER PUBLICATIONS

U.S. Office Action dated Jan. 23, 2013 issued in U.S. Appl. No. 13/445,653.

U.S. Final Office Action dated Jul. 18, 2013 issued in U.S. Appl. No. 13/445,653.

"Google Plus Users", Google+Ripples, Oct. 31, 2011 [retrieved on Feb. 21, 2012 from Internet at http://www.googleplusers.com/google-ripples.html], 3 pages.

U.S. Final Office Action dated Sep. 11, 2013 issued in U.S. Appl. No. 12/445,648.

U.S. Advisory Action dated Nov. 5, 2013 issued in U.S. Appl. No. 13/445,653.

U.S. Office Action dated Feb. 11, 2014 issued in U.S. Appl. No. 13/445,653.

U.S. Final Office Action dated Aug. 12, 2014 issued in U.S. Appl. No. 13/445,653.

U.S. Office Action dated Nov. 7, 2014 issued in U.S. Appl. No. 13/445,648.

\* cited by examiner

COMPUTER IMPLEMENTED SYSTEMS AND METHODS FOR PROVIDING A MOBILE SOCIAL ENTERPRISE INTERFACE

PRIORITY AND RELATED APPLICATION DATA

This application claims priority to commonly assigned U.S. Provisional Patent Application No. 61/502,053, titled "Systems and Methods for Providing a Mobile Social Enterprise Interface", by Tyler Ziemann, filed on Jun. 28, 2011, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present application relates generally to providing on-demand services in a network using a database system and, more specifically, to techniques for updating and visualizing information stored in the database system over the network.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process operations for the disclosed inventive systems, apparatus, and methods for providing a mobile social interface. These drawings in no way limit any changes in form and detail that may be made by one skilled in the art without departing from the spirit and scope of the disclosed implementations.

FIG. 7 illustrates an example of an image 700 of a user interface that presents the identified shared contact data after applying one or more filters in accordance with some implementations of method 200.

FIG. 10 illustrates an example of an image 1000 of a user interface that may be used to store search parameters in accordance with some implementations of method 200.

FIG. 11 illustrates an example of an image 1100 of a user interface that may be used to issue a request to reconcile private contact data with shared contact data in accordance with some implementations of method 300.

FIG. 16 illustrates an example of an image 1600 of a user interface that may be used to receive a request to perform a location-based search of contact data, in accordance with some implementations.

FIG. 19 illustrates an example of an image 1900 of a user interface that may be used to store the search parameters and the location parameters used to conduct location-based contact search method 500, in accordance with some implementations.

DETAILED DESCRIPTION

Figure 1:
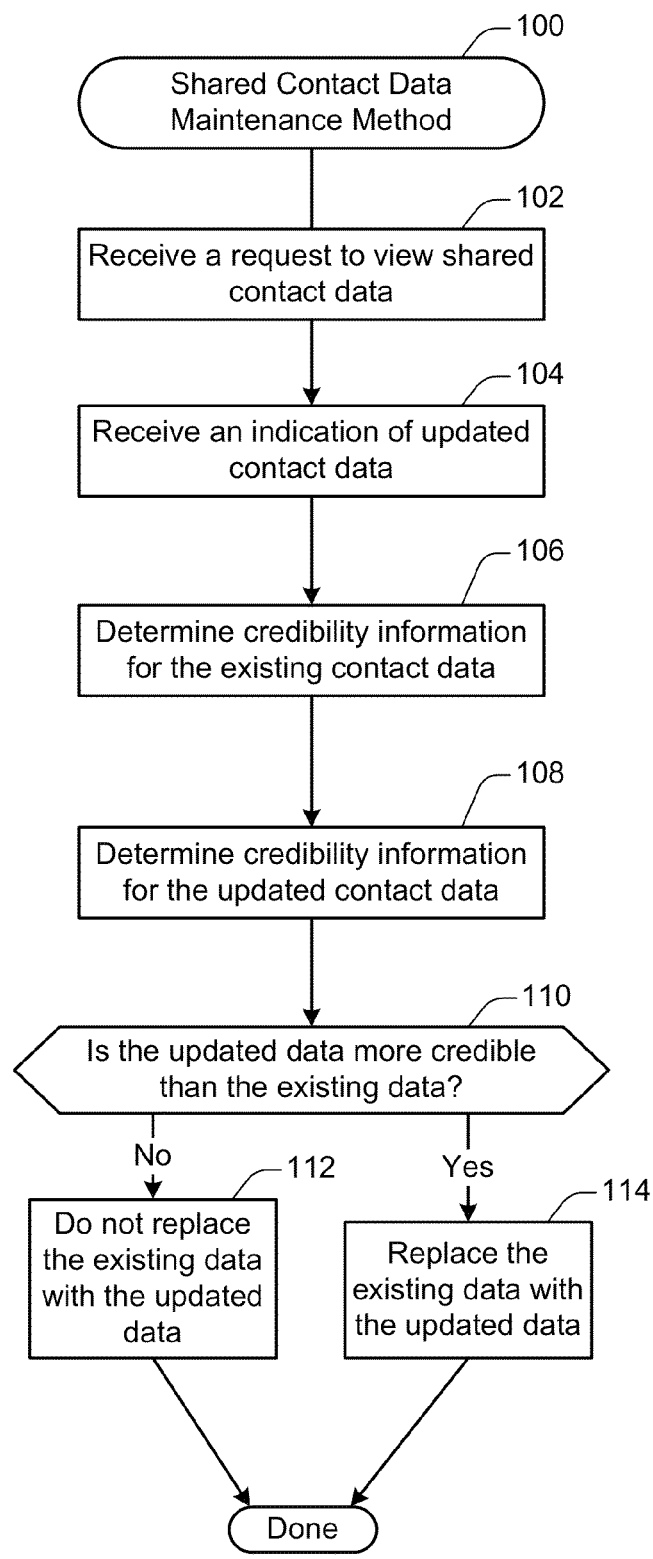
FIG. 1 shows a flowchart of an example of a shared contact data maintenance method 100, performed in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, well known process/method steps have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Conventional methods of storing contact information do not provide as much contact information for a particular contact as may be available. "Contact information" may refer to information that identifies particular traits or distinguishing characteristics associated with an entity, particularly information for how one can identify and reach, i.e., contact that entity. The entity may be a business entity, such as a company, or an individual such as an employee of a company. By way of example, contact information associated with the business entity may identify a phone number or business address that may be used to contact the business entity. While conventional methods of storing contact information may allow a user to manually input and store contact information, they do not provide the user with access to additional sources of contact information that may be used to enrich the potentially limited amount of contact information known to the user.

In one conventional scenario, a user may create a list of contacts and may store various contact information associated with each contact included in the list. The contacts may be stored locally on a computing device, or on a server. While the user may be provided access to the user's own contact information stored either locally or remotely, if the user wishes to supplement the user's contact information, the user must find a way to locate the additional contact information and update the user's contact information by inputting the additional contact information manually. Thus, the user may have to locate and access a website associated with a business, copy a piece of contact information associated with the business, such as a phone number, and then input the phone number into the user's own contact data.

Other limitations of conventional methods relate to searching contacts with respect to geographical information. For example, a user of a database service may be a traveling salesperson who has created a list of contacts, which represent sales opportunities. In this example, if the salesperson arrives at a new or unfamiliar location, the salesperson's contact information might not include any contacts or sales opportunities in the new area because the salesperson might not know anyone in the area. In order to identify potential new contacts and sales opportunities in the area, the salesperson may manually perform an internet search and attempt to identify new contacts within the salesperson's proximity based on information returned by the search. However, such a process may be laborious, as it may require the user to manually identify potential new contacts through independent searching. Furthermore, the internet search may be performed on a small or limited set of data.

The disclosed implementations provide a user with the ability to access shared contact information stored in a shared database to which multiple entities contribute contact information. Thus, shared contact information stored in the shared database may be "crowd sourced." The disclosed implementations may further allow the user to retrieve contact information from the shared database. Because multiple entities contribute information to the shared database, the shared contact information stored in the shared database may provide a centralized repository of shared contact information that has far more contact information associated with a particular contact than the user's own contact data. In some implementations, the user may be provided with access to the shared contact information as part of a database service the user has subscribed to.

In one example, the user may store contact information in a virtual portion of a multi-tenant database system operated and maintained by an on-demand database service provider. The virtual portion of the database system may be a portion of the database system that is provided by the database service provider as part of a service the user subscribes to, and that is accessible only by the user and not by other users of the database system. In various implementations, a virtual portion of the on-demand service environment is called an "org." Thus, in some implementations, a user may subscribe to a service provided by a database service provider. The database service provider may provide the user with an org in response to the user successfully subscribing to a particular service. Thus, the org may provide the user with a portion of the database service provider's database system that functions as a "sand box" capable of implementing any database service that the user has subscribed to and is permitted access to.

Accordingly, when the user logs in to the user's virtual portion of the database system, the user may access and view the user's contact information. The user may be provided with an indication that additional contact information is available. The additional contact information may be obtained from the shared database. Thus, the user may choose to import the additional contact information into the user's contact information from the shared contact information. In response to receiving the user's selection, the database service provider may import the relevant additional contact information into the user's contact information automatically.

The disclosed implementations further provide a user with access to geographical information that identifies a geographical location associated with the contact. In various implementations, a database service provider may search private contact data as well as "crowd sourced" shared contact data associated with a contact, and retrieve contact information associated with the contact. In various implementations, the contact information may include geographical information that identifies a geographical location associated with the contact. In various implementations, a database service provider may be able to use geographical information associated with the user and the identified contact to determine a distance between the user and the identified contact.

Thus, in various implementations a user may issue a request to conduct a location-based search of contact data. The database service provider may search the contact data and identify relevant contacts based on a set of retrieved parameters. In various implementations, the parameters may include a designated geographical distance from the user. Thus, the database service provider may use contact data to determine a distance between the contact and the user. The database service provider may then compare the determined distance with the designated geographical distance. If the determined distance is less than the designated geographical distance, the contact may be included as a result of the search. Thus, in response to receiving a request to perform a location-based search of contact data, contact data including crowd sourced shared contact data may be searched, and relevant contacts within the user's proximity may be returned.

In various implementations, the user may not have been previously aware of the displayed contact information. Thus, a geographical representation of the identified contacts generated and displayed on a user system's display device, for instance, in a graphical user interface (GUI), may inform the user of other contacts or sales opportunities within the user's geographical proximity of which the user was not previously aware. Furthermore, the geographical representation may provide the user with contact information that may be used to communicate with the identified contacts, such as a phone number or business address.

Furthermore, the search parameters may be stored so that the search may be repeated subsequently. In various implementations, the search may be repeated as part of an automatic process performed by a computer application provided by the database service provider. Thus, according to various implementations, if the user changes locations, the search may be repeated and the results of the search may be updated. In various implementations, a notification, such as an email message or a text message, is provided to the user indicating that the search has been repeated and new contacts have been identified.

These and other embodiments may be implemented by various types of hardware, software, firmware, etc. For example, some embodiments may be implemented, at least in part, by machine-readable media that include program instructions, state information, etc., for performing various services and operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM"). These and other features and benefits of the disclosed embodiments will be described in more detail below with reference to the associated drawings.

FIG. 1 shows a flowchart of an example of a shared contact data maintenance method 100, performed in accordance with some implementations. In various implementations, the method 100 may be used to receive an indication of updated contact data, determine credibility information associated with the updated contact data, and update the shared contact data when the updated contact data is more credible then the existing contact data.

In FIG. 1, at block 102, a request to view shared contact data may be received. In various implementations, a request may be received when a user of an on-demand database service provided by a database service provider wishes to view or contribute to shared contact data.

In various implementations, the contact data may describe a particular industry or business associated with the entity. For example, if the entity associated with the contact data is an employee of a company or corporation, the contact data may include the employee's name, occupational title, role within the organization that employs the individual, the employee's email address, mailing address, the employee's phone number, fax number, and an account name associated with the employee. The contact data may also include various other social network data associated with the employee, such as a list of which social networks the employee belongs to, and which "handles", user ID's, or other identifiers may be associated with the employee within each respective social network.

If the entity associated with the contact data is a company or corporation, the contact data may include information such as the company's name, phone number, email address, website url, billing address, and shipping address. The contact data may also include additional information associated with the company, such as the total worth of the company, the annual revenue earned by the company, primary place of business, the number of employees employed by the company, Dun & Bradstreet (D-U-N-S) number, Standard Industry Classification (SIC) number, and North American Industry Classification System (NAICS) number.

In various implementations, the contact data may comprise contact data items. Thus, contact data may refer to all available contact information associated with an entity, such as all biographical information associated with a sales representative. A contact data item may refer to a specific data object storing a piece of information associated with the entity, such as a phone number associated with the sales representative.

In various implementations, the contact data may be stored in one or more records. A record may generally refer to a data entity, such as an instance of a data object created by a user of the database service, for example, about a particular entity with which contact data is associated. The data object can have a data structure defined by a database service (a standard object) or defined by a subscriber (custom object). In one embodiment implementing a multi-tenant database, all of the records for the tenants have an identifier stored in a common table. In various implementations, there may be several types of records, each of which is associated with a particular entity. For example, a "Contact" record may store information with a contact, such as biographical information, while a "Lead" record may store information associated with a lead, such as information regarding a prospect or potential business opportunity. Furthermore, an "Account" record may store information associated with an account belonging to a user's business. The account may be, for example, a customer, a competitor, or a partner.

In various implementations, a record has data fields that are defined by the structure of the object (e.g. fields of certain data types and purposes). A record can also have custom fields defined by a user. A field can be another record or include links thereto, thereby providing a parent-child relationship between the records. Thus, according to various implementations, contact data associated with an entity, such as a contact, may be stored in various data fields included in a record. Each of the fields may store a contact data item associated with an entity, such as a contact.

In various implementations, the contact data may be shared contact data. Shared contact data may be contact data that is stored in an on-demand database service environment such that access to the data is shared by users of the database services provided by the database service provider. Thus, the shared contact data may be contributed to and accessible by a plurality of entities associated with the database service, such as users of the database service. Thus, a first entity, such as a contact, may have associated shared contact data stored in a database system. The shared contact data may include a plurality of shared contact data items representing contact information associated with the first entity, such as a business address or occupational title. In various implementations, a second and third entity may be able to access the shared contact data and shared contact data items. The second and third entity may be users of the database service provided by the on-demand service provider. Moreover, in various implementations, the second and third entities may be able to edit the shared contact data items or contribute additional information to the records storing the shared contact data items. Thus, according to various implementations multiple entities may access or contribute information to shared contact data associated with a single entity. Accordingly, the shared contact data may include contact data aggregated from several entities. In various implementations, the entities may be users that subscribe to a service provided by the database service provider.

In various implementations, the shared contact data may be stored in a virtual portion of the database service environment. The virtual portion may represent a partition of a database system. In some implementations, the database system may be a multi-tenant database system. A plurality of settings may define the virtual portion of the database system. The plurality of settings may identify which entities have read and write access to the records stored in the virtual portion of the database system. Thus, the plurality of settings associated with the virtual portion of the database may identify what entities have read and write access to the shared contact data stored within the virtual portion of the database system. In various embodiments, the plurality of settings may be set and controlled by the database service provider. Accordingly, the database service provider may control which entities have read and write access to the records storing the shared contact data.

Returning to FIG. 1, step 102, in various implementations, the request to view the shared contact data may be received from an entity, such as a user of the database service. For example, the request may be in the form of a query issued to a virtual portion of a multi-tenant database used to store the shared contact data. Thus, a user of a database service may query a database system, or more specifically, the virtual portion of the database system storing the shared contact data to view various shared contact data items stored therein. The request may be received and handled by the database service provider which operates and maintains the database system.

In FIG. 1, at block 104, an indication of updated contact data may be received. According to some implementations, updated contact data may refer to contact data including new or updated contact information associated with existing shared contact data. Thus, the updated contact data may include additional or new contact data items associated with an existing record already stored in the shared contact data.

The indication of updated contact data may be a message issued to the database service provider from a user of the database service. In various implementations, the indication of updated contact data may indicate that the user has provided updated contact data to be included into the shared contact data. Thus, in various implementations, if a user of the database system attempts to contribute contact information to the shared contact data, an indication of updated contact data may be issued to the database service provider.

In various implementations, the user may provide updated contact data in response to being presented with existing shared contact data. For example, a user may be presented with existing shared contact data associated with a sales representative at an organization. The shared contact data may include the occupational title of the sales representative. The occupational title may be "sales manager." The user may have learned from a previous interaction with the sales representative that the sales representative has a new occupational title that is not currently reflected in the shared contact data. The new occupational title may be "regional sales manager." The user may then provide the new occupational title to the database service provider as updated contact data. As discussed in greater detail below with regard to block 110, the database service provider may determine whether or not the new occupational title should be included in the shared contact data associated with the sales representative.

Thus, according to various implementations, the database service provider may store shared contact data associated with a contact in a virtual portion of a database, and may receive updated contact data associated with the contact from at least one user of the database system. The database service provider may then assess the credibility of the existing shared contact data already stored in the database system and the credibility of the updated contact data to determine which contact data is more credible, and should be stored for future use.

Accordingly, in FIG. 1, at block 106, credibility information for the existing shared contact data may be determined. Credibility information may provide information about how likely contact data associated with a contact, such as an organization or an individual, is true or valid. For example, credibility information may provide an indication of whether or not a phone number associated with a contact is a valid phone number or not. Thus, credibility information may be used to determine whether or not contact information is credible, and whether or not contact information should be included in the shared contact data.

In various implementations, the credibility information may be determined based on characteristics of the contact data. Such characteristics may include how recently the contact information was obtained, how many users have contributed the same or similar contact information, and whether the contact information is the proper type of information for a particular type of the shared contact data item. For example, a phone number submitted as a contact's name would not be a proper type of information for that particular type of the shared contact data item, and would not be deemed credible.

In various implementations, the credibility information associated with the existing shared contact data may be determined by the database service provider. For example, the database service provider may use characteristics of the contact information to infer how credible the contact information is. In one example, a phone number associated with an employee of an organization may be stored in a data field of a record storing shared contact data associated with the employee. The phone number may be stored in a data field identified as the employee's direct line. However, the phone number may actually be a general contact number associated with the employee's organization. The database service provider may infer that the phone number is not the employee's direct phone line based on characteristics of the phone number. For example, if the last three digits of the phone number are zeros, the phone number is not likely to be a direct phone line, and instead more likely to be the general contact number for the employee's organization. Based on this determination, the database service provider may determine that the phone number is not credible.

In some implementations, the credibility information may be determined based on characteristics of the source of the contact data. The source of the contact data may refer to the source of the indication of updated contact data. For example, the source may be a user of the database service attempting to contribute updated contact data to the shared contact data. Characteristics of the source of the contact data may include the reliability of the contributor, the response rate of the contributor, the social influence of the contributor, the seniority of the contributor at his or her particular organization, and previous credibility determinations associated with the contributor.

In various implementations, the credibility information associated with the existing shared contact data may be stored within the same record as the existing shared contact data. In some implementations, the credibility information associated with the existing shared contact data may be stored in a separate record than the existing shared contact data. For example, credibility information, such as how recently a contact data item was contributed, may be stored in a record separate from the contact data associated with the credibility information.

In FIG. 1, at block 108, credibility information for the updated contact data may be determined. The credibility information for the updated contact data may provide information indicative of the credibility of the updated contact data. Similar to the credibility information discussed above at step 106 and with respect to the existing contact data, credibility information associated with the updated contact data may be inferred from contact data itself, or from the source of the contact data. The credibility information associated with the updated contact data may be stored in the same record or a different record as the updated contact data.

As discussed above with respect to block 106, the credibility information for the updated contact data may be determined based on the data obtained from a user of a database service provided by the database service provider. The credibility information may then be stored by the database service provider.

In FIG. 1, at block 110, it may be determined whether the updated contact data or the existing shared contact data is more credible. In various implementations, the database service provider may determine which contact data is more credible based on a comparison between the credibility information associated with the existing shared contact data and the credibility information associated with updated contact data.

In various implementations, the determination of which contact data is more credible may be made in accordance with several criteria. Thus, the criteria may specify a set of rules used to make the determination. For example, the criteria for making a credibility determination may specify that recent contact information is more credible than older contact information. In this instance, the database service provider may compare a value stored in a data field used to store credibility data associated with the more recent contact data with a value stored in a data field used to store credibility data associated with the older contact data. The credibility data may, for example, identify when contact data associated with the credibility data was contributed. Upon comparing the different values, the database service provider may use the established criteria for making the credibility determination in order to determine that the more recent contact data is more credible than the older contact data.

In various implementations, the criteria used to make a credibility determination may be specified by the database service provider. Thus, the database service provider may determine the criteria and rules used as the basis of the credibility determination. For example, the database service provider may determine that a credibility determination may be made based on a position within a hierarchy of an organization. For example, the database service provider may specify that contact information provided by a manager of a company is more credible than contact information received from an employee subordinate to the manager because the manager has a higher position in the organization's hierarchy. In this instance, if both the manager and the employee submitted conflicting contact data, the contact information submitted by the manager would be determined to be more credible based on his higher position within the hierarchy of the organization. It will be appreciated that various other criteria may be used for various characteristics associated with the contact information itself, and the contributor of the contact information.

In some implementations, the criterion used to make the determination may be stored in a database as a record. Thus, the record may include a plurality of data fields used to store the criteria that form the basis of the credibility determination. In various implementations, the record storing the criteria may be recalled at a later time during a subsequent determination. Thus, the stored criteria may be applied to multiple credibility determinations.

In various implementations, the database service provider may use the above-referenced criteria to determine whether the updated contact data or the existing shared contact data is more credible. Thus, the database service provider may compare credibility information associated with the updated contact data with credibility information associated with the existing shared contact data in accordance with various criteria specified by the database service provider.

If it is determined that the existing shared contact data is more credible than the updated contact data, in FIG. 1, at block 112, the existing shared contact data may be retained. As discussed above with respect to block 106, the existing shared contact data may be stored as a record in a multi-tenant database system. If the existing shared contact data is more credible than the updated contact data, the record storing the existing shared contact data remains unchanged, and the values stored within the record remain unchanged. Thus, according to various implementations, the existing shared contact data is retained, while the updated contact data may be discarded.

In various implementations, instead of being discarded, the updated contact data may be stored in a separate record. The separate record may be referred to in future credibility determinations if the information stored in the separate record is relevant. For example, if an address associated with an organization is submitted to the database service provider as updated contact data but determined to be less credible than the address already stored in the existing shared contact data, the submitted address may be stored in a separate record in the database service provider's database. If the discarded address is submitted again by a different user, the database service provider may query the database storing the separate records to determine how many times this address has been submitted. The database service provider may then factor that information into the credibility determination. For example, if that address has been submitted several times, it may be deemed more credible than if had only been submitted once.

If it is determined that the updated contact data is more credible than the existing shared contact data, in FIG. 1, at block 114, the existing shared contact data may be replaced by the updated contact data. Thus, the appropriate values of the data fields of the record storing the existing shared contact data may be overwritten with the values of the updated contact data. Returning to a previous example, an address associated with an organization may be submitted to the database service provider as updated contact data. If the address is deemed more credible than the address stored in the existing shared contact data, the existing shared contact data may be overwritten, thus updating the existing shared contact data with the new address of the organization.

Figure 2:
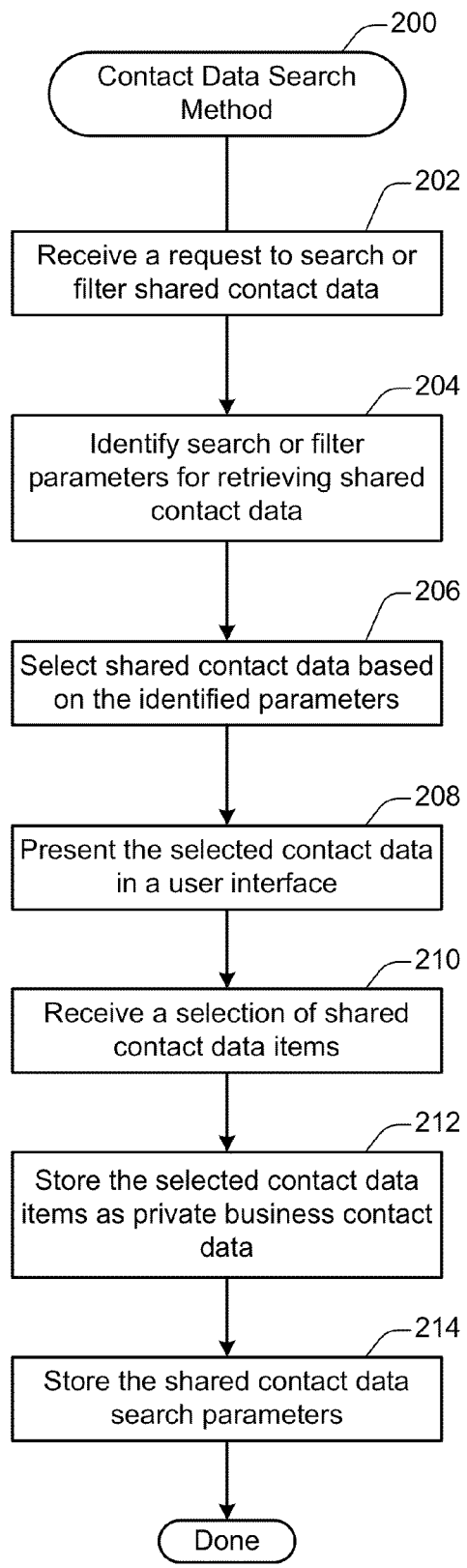
FIG. 2 shows a flowchart of an example of a contact data search method 200, performed in accordance with some implementations.

FIG. 2 shows a flowchart of an example of a contact data search method 200, performed in accordance with some implementations. In various implementations, method 200 may be used to receive a request to search or filter shared contact data, select shared contact data based on search or filter parameters, and store selected contact data as private contact data.

In FIG. 2, at block 202, a request to search or filter shared contact data may be received. A user may issue such a request to locate additional contact information. In various implementations, the user may have stored private contact data within the user's own virtual portion of the database system. Private contact data may be contact data that has been provided by the user and is only accessible by the user. For example, a user may log into a virtual portion of the database service environment that has been provided by the database service provider as part of a database service that the user subscribes to. This virtual portion may be a portion of the database service environment that is fully accessible by the user, but is not accessible by other entities using the database service environment. Thus, contact data stored in the user's virtual portion of the database is private contact data because other users of the database service do not have access to it.

The user may determine that additional contact information should be obtained. For example, the user may have stored contact data associated with a group of sales representatives in a sales division associated with a company. However, the private contact data may be missing specific contact data items, such as a fax number associated with one of the sales representatives. Moreover, there may be other sales representatives within that sales division for whom the user has no contact information. Thus, the user may issue a request to search the shared contact data for additional contact information that may provide additional information about contacts that already exist within the user's own private contact data, and additional contacts that don't already exist in the user's private contact data.

In some implementations, the user may issue the request through a user interface. The user interface may be provided by the database service provider to the user at a computer system. In various implementations, the computer system may be a personal computer, a mobile computing device, or a mobile telecommunications device. Thus, the user interface may be presented to a user through one of several computing platforms, such as a mobile platform or a personal computer.

In various implementations, the request may be a message that includes information, such as search or filter parameters specified by the user that forms the basis for searching and filtering the shared contact data. Thus, the specified information may be used to query a database storing shared contact data. In some implementations, the database may be operated and maintained by the database service provider, and the request to search or filter the shared business contact data may be received by the database service provider.

In FIG. 2, at block 204, search or filter parameters for retrieving shared contact data may be identified. The search or filter parameters may form the basis for searching or filtering shared contact data stored and maintained by the database service provider. Thus, the database service provider may use the search and filter parameters to identify shared contact data items and return the results of a search requested by the user.

In various implementations, a search parameter may be a parameter that identifies contact data items that are relevant to the user's request. In various implementations, the search parameter may be associated with a specific data field of shared contact data records used to store shared contact data. The search parameter may identify a value that may be stored in the associated data field. For example, the search parameter may identify a value representing a company name, an occupational title, a geographic location, an industry, or a sub-industry. In one example, the search parameter may be associated with an occupational title associated with a contact. The search parameter may identify a specific occupational title, such as "regional sales manager." Records storing shared contact data may each include a data field storing an occupational title associated with a contact. Thus, the identified search parameter, i.e. the occupational title, may correspond to a data field included in the shared contact data records. Furthermore, a search performed based on the search parameter may search values stored in the corresponding data fields of the shared data records. For example, the search may be performed on data fields associated with an occupational title. Contact data items returning a value of "regional sales manager" may be identified and returned.

In various implementations, a filter parameter may be a parameter that identifies how items returned by the search are sorted or filtered. For example, a filter parameter may be a company name, a department at which an employee works, or a level of seniority associated with an employee. In various implementations, the filter parameter may be provided by the user after the search has returned a plurality of shared contact data items based on a search parameter. Thus, according to some implementations, the user may be presented with the results of the search at the user interface.

In various embodiments, the database service provider may identify search and filter parameters based on information included in the request issued by the user. As discussed with respect to FIG. 2, block 202, the user may specify search and filter parameters when formulating the request. Thus, the message may be a record that includes several data fields storing the specified parameters. The database service provider may identify the search and filter parameters based on the values stored in the data fields of the message. Therefore, upon receiving the request, the database service provider may identify the search and filter parameters based on the parameters specified by the user.

In FIG. 2, at block 206, shared contact data may be identified based on the identified parameters. Thus, the database service provider may search the shared contact data based on the identified search and filter parameters and identify shared contact data items that satisfy the search and filter parameters. As previously discussed, a record storing shared contact data may include a plurality of data fields, each of the data fields storing a shared contact data item representing contact information that may be associated with an entity. If a record stores a contact data item representing a value identified by the search parameter, the record may be returned as a search result.

In FIG. 2, at block 208, the identified shared contact data may be presented to a user at a user interface. Accordingly, the user may be presented with the results of the search which may include additional contact information not presently stored in the user's private contact data. Moreover, the presentation of the identified shared contact data may be filtered according to the user's preference, thus presenting the results in a manner specified by the user.

In various implementations, the identified shared contact data returned by the search may be filtered dynamically. Thus, all search results may be presented to the user at the user interface. The user may then select and apply filters to the returned search results in response to being presented with the search results. For example, the user may select and apply a first filter to the search results, such as a name of a business. The user may then select and apply a second filter, such as a department associated with the business. In some implementations, the second filter may be applied to the original search results, and the first filter may be removed in response to the user selecting the second filter. In various implementations, the search results may be filtered according to both the first and second filter in response to the user selecting the second filter.

Figure 6:
FIG. 6 illustrates an example of an image 600 of a user interface displaying identified shared contact data that is filtered by department in accordance with some implementations of method 200.

FIG. 6 illustrates an example of an image 600 of a user interface displaying identified shared contact data that is filtered by department in accordance with some implementations of method 200. In one example, image 600 of the user interface may include data fields 602, 604, and 606.

Data field 602 may include a plurality of data fields associated with the shared contact data. The user may enter the search parameters into the plurality of data fields. The search parameters may be used to perform a search that identifies a plurality of shared contact data items based on the search parameters. In this instance, a parameter of "www.ucshealth.org" has been chosen and entered into a data field identified as "Company or Website." Thus, a search may be performed to identify and return records storing shared contact data that include a value of "www.ucshealth.org" in a field identified as "company" or "website."

Data field 604 may include a plurality of data fields allowing the user to select filters to apply to the shared contact data items returned by the search. In various implementations, the filters available to the user may be organized into groups. For example, the filters may be organized or grouped according to type of information associated with an organization. In this instance, the filters are organized according to "company name," "department," and "level," where "level" identifies a contact's level within the hierarchy of an organization. In various implementations, a contact's level within an organization may be inferred by the contact's occupational title and known relationships between occupational titles.

Data field 606 may include the plurality of shared contact data items that have been returned by the search based on the search parameters specified in data field 602, and filtered according to the filter parameters specified in data field 604. Data field 606 may include a plurality of data fields displaying various shared contact data items. In this instance, data field 606 may display a contact's name, email address, phone number, company or employer, occupational title, and geographical location. Data field 606 may also display an indication of the last time the shared business contact data item was updated. As shown in data field 606, information associated with a plurality of contacts may be simultaneously presented to the user at the user interface.

Figure 7:
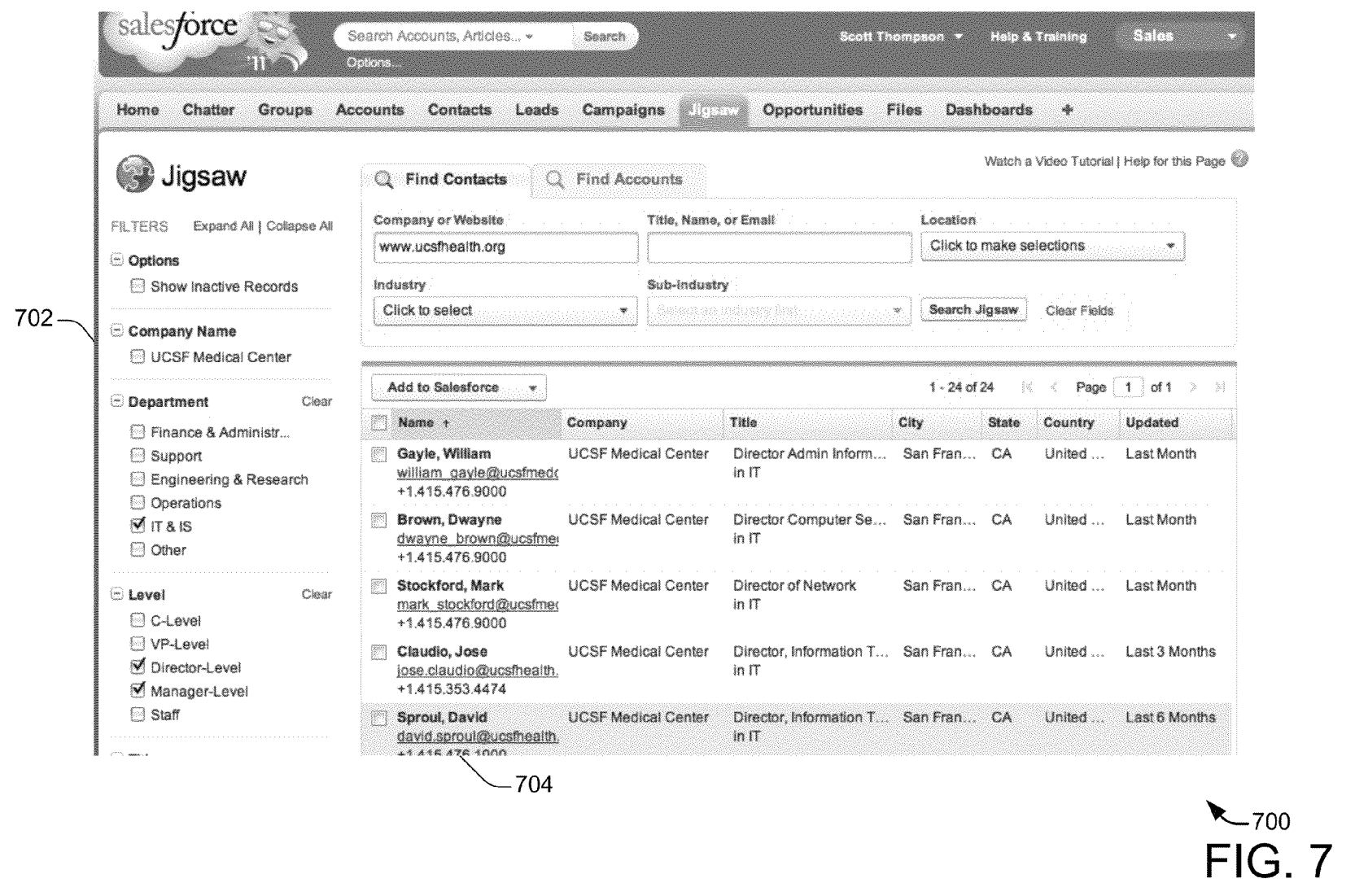

FIG. 7 illustrates an example of an image 700 of a user interface that presents the identified shared contact data after applying one or more filters in accordance with some implementations of method 200. As shown in data field 702, multiple filters may be applied simultaneously to the shared contact data items returned by the search. In this instance, the user has chosen to apply a filter of "IT & IS," "Director-Level," and "Manager-level." Accordingly, the returned items may be filtered according to a department and level associated with each shared contact data item. As shown in data field 704, only contacts having a company of "UCSF Medical Center" (as identified by the search parameter), having a level (e.g. occupational title) equivalent to "Director" or "Manager," and having a department of "IT" or "IS" are returned by the search and displayed to the user.

Returning to FIG. 2, at block 210, a selection of contact data items may be received. The selection of contact data items may be made by the user through the user interface in response to being presented with the shared contact data identified by the search. The selection may identify specific contact data items that the user has chosen to integrate into the user's own private contact data. Thus, the user may determine which of the identified shared contact data items should be stored, and which of the identified shared contact data items should not be stored.

Figure 8:
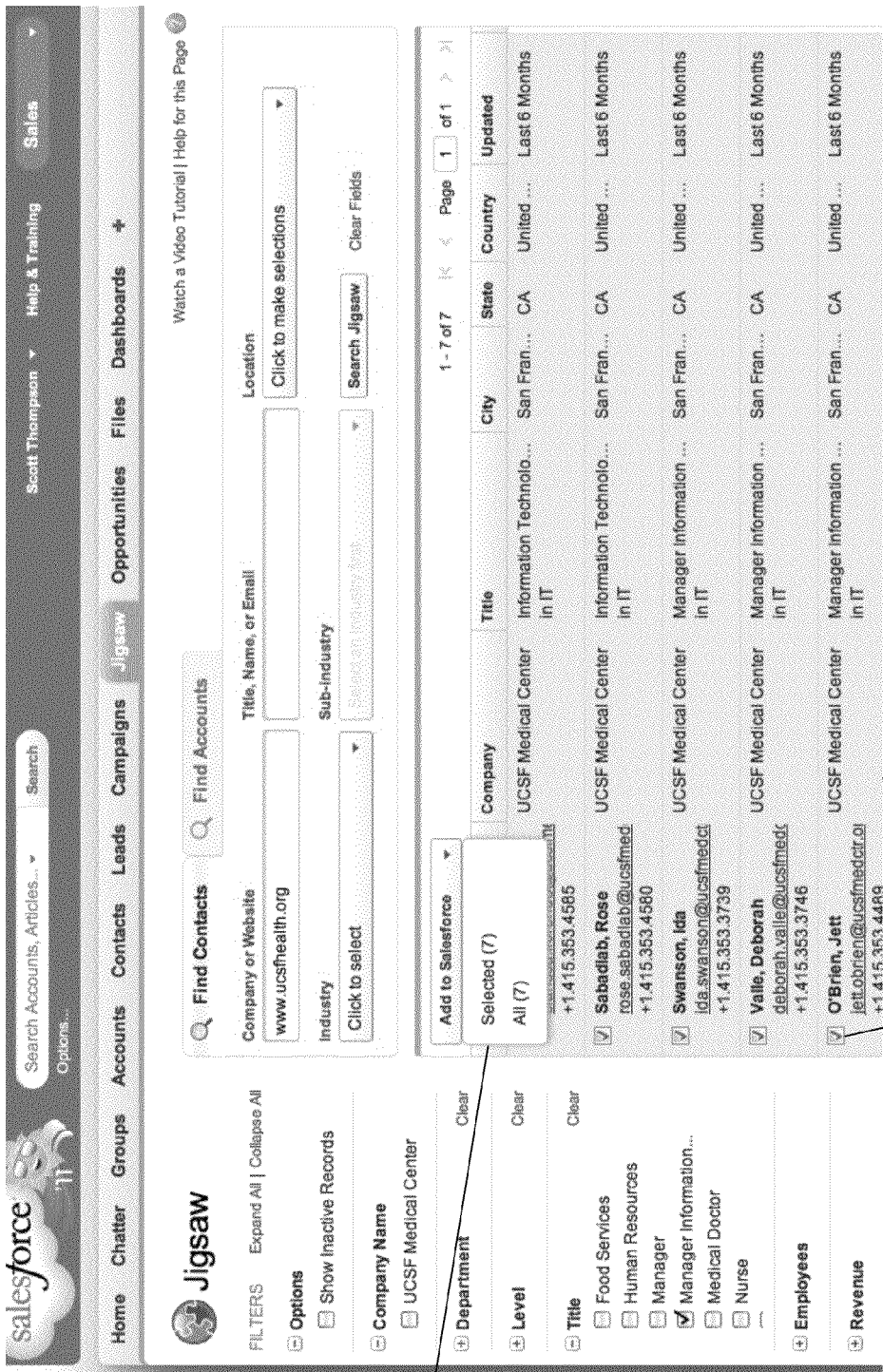
FIG. 8 illustrates an example of an image 800 of a user interface that allows a user to select shared contact data items to store as private contact data in accordance with some implementations of method 200.

FIG. 8 illustrates an example of an image 800 of a user interface that allows a user to select shared contact data items to store as private contact data in accordance with some implementations of method 200. Data field 802 may display various information associated with a plurality of shared contact data items that have been returned by a search based on a search parameter, and that have been filtered according to at least one filter parameter. In various implementations, data field 804 may include a plurality of data fields, each of the data fields being associated with one of the returned items. Each of the data fields may receive an input that indicates that the returned shared contact data item associated with the data field has been selected to be stored as private contact data. In this instance, the plurality of data fields is comprised of several checkboxes. Thus, according to various embodiments, the user may check a checkbox next to each returned item that the user determines should be included in the private contact data. Data field 806 may receive an input from the user indicating that the selected shared contact data items should be stored as private contact data. In this instance, data field 806 may provide a drop down box that identifies a location where the items should be stored. In various implementations, the location may be the user's own virtual portion of the database system.

Returning to FIG. 2, at block 212, the selected contact data items may be stored. In various implementations, the selected contact data items may be stored locally in the user's own computer system. Thus, a user may select specific contact data items that the user has determined should be included in the user's private contact data, and then store the selected contact data items locally. As previously discussed, the local computer system may be a personal computer or a mobile device. When stored locally, the user may access the contact data without a connection, such as a network connection, to the database service provider.

Moreover, according to various implementations, the user's private contact data may be stored in a virtual portion of a multi-tenant database. Accordingly, while the user interface may be presented to the user at a local computer system, the user's private contact data may be stored remotely in a multi-tenant database system that is part of a cloud-based on-demand database service environment. In this example, the selected contact data items may be stored in the virtual portion of the database system associated with the user. In various implementations, the contact data may be stored both locally and remotely.

In some implementations, the user may determine what type of record is used to store the shared contact data. As previously discussed with respect to FIG. 1, block 102, a record may be one of several types of record. For example, a record may represent a contact, lead, or account. Thus, according to various implementations, the user may determine whether the selected contact data is stored as a contact, a lead, or as an account.

Figure 9:
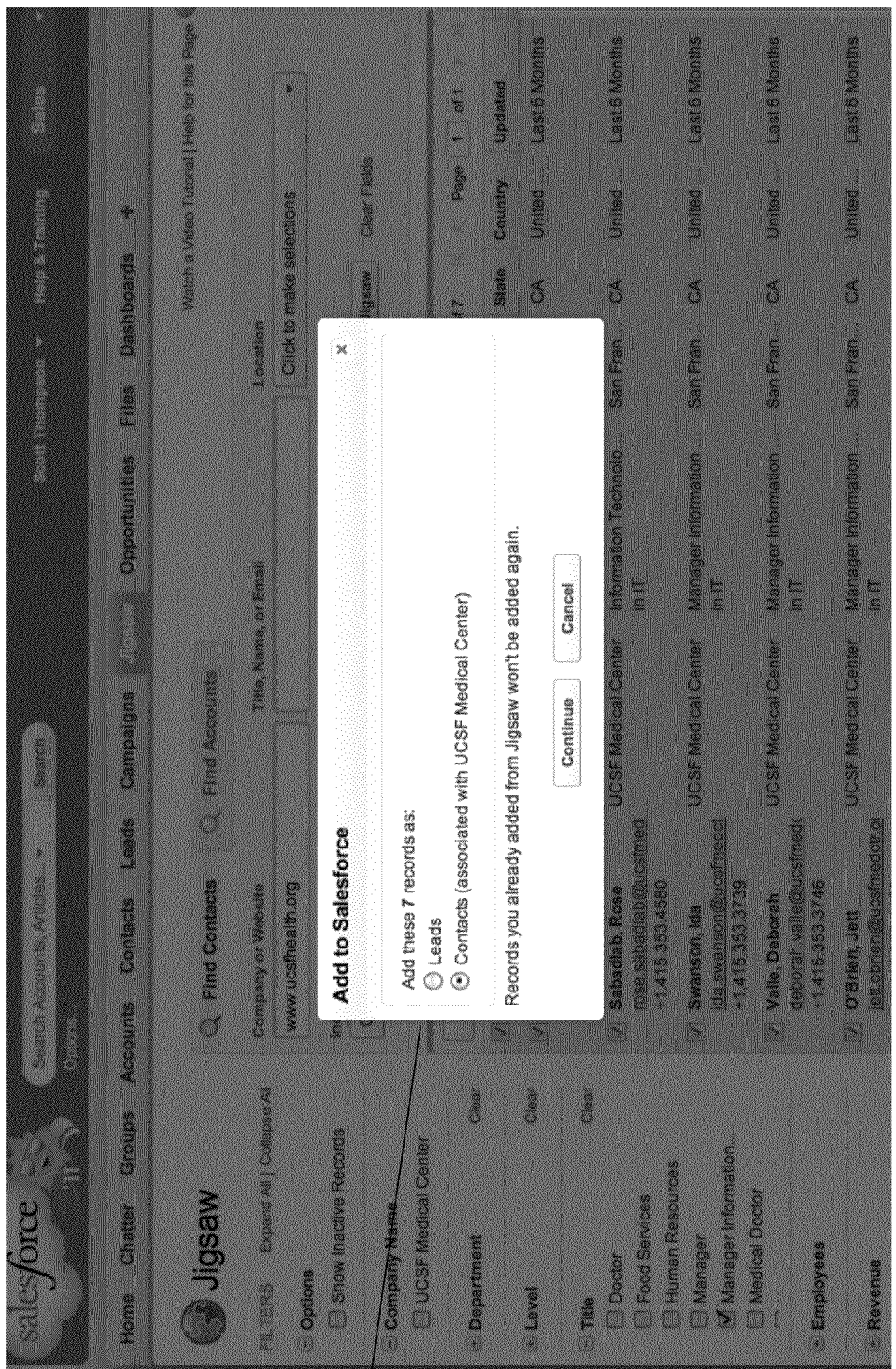
FIG. 9 illustrates an example of an image 900 of a user interface that may be used to determine how selected shared contact data items are stored as private contact data in accordance with some implementations of method 200.

FIG. 9 illustrates an example of an image 900 of a user interface that may be used to determine how selected shared contact data items are stored as private contact data in accordance with some implementations of method 200. A user may be provided with the user interface illustrated by image 900 in response to the user selecting shared contact data items to store. Data field 902 may provide the user with a list of options that may allow the user to determine how the selected shared contact data items are stored. For example, the user may provide an input to data field 902 that identifies what type of record a selected contact data item belongs to. In this instance, data field 902 has presented the user with the option of storing the selected contact data items as "Leads" or "Contacts." In this instance, the user has chosen "Contacts." Accordingly, the selected shared contact items may be stored in the private contact data as "Contacts." In various implementations, if a selected shared contact data item already exists in the private contact data, the selected item is not stored.

Returning to FIG. 2, at block 214, the shared contact data search parameters may be stored. Thus, in various implementations, in addition to storing the selected shared contact data items, the database service provider may also store the parameters used to identify the selected shared contact data items. As similarly discussed with reference to FIG. 2, block 212, the search parameters may be stored locally or remotely. In various implementations, the stored search parameters may be retrieved and used for future searches performed by the user.

In various implementations, the stored search parameters may provide a search history accessible by the user. For example, upon initiating a search, the user may access the user's search history and recall a previous search performed with parameters previously entered by the user. Thus, according to various implementations, the user may recall the results of a previously performed search based on the stored parameters.

Figure 10:
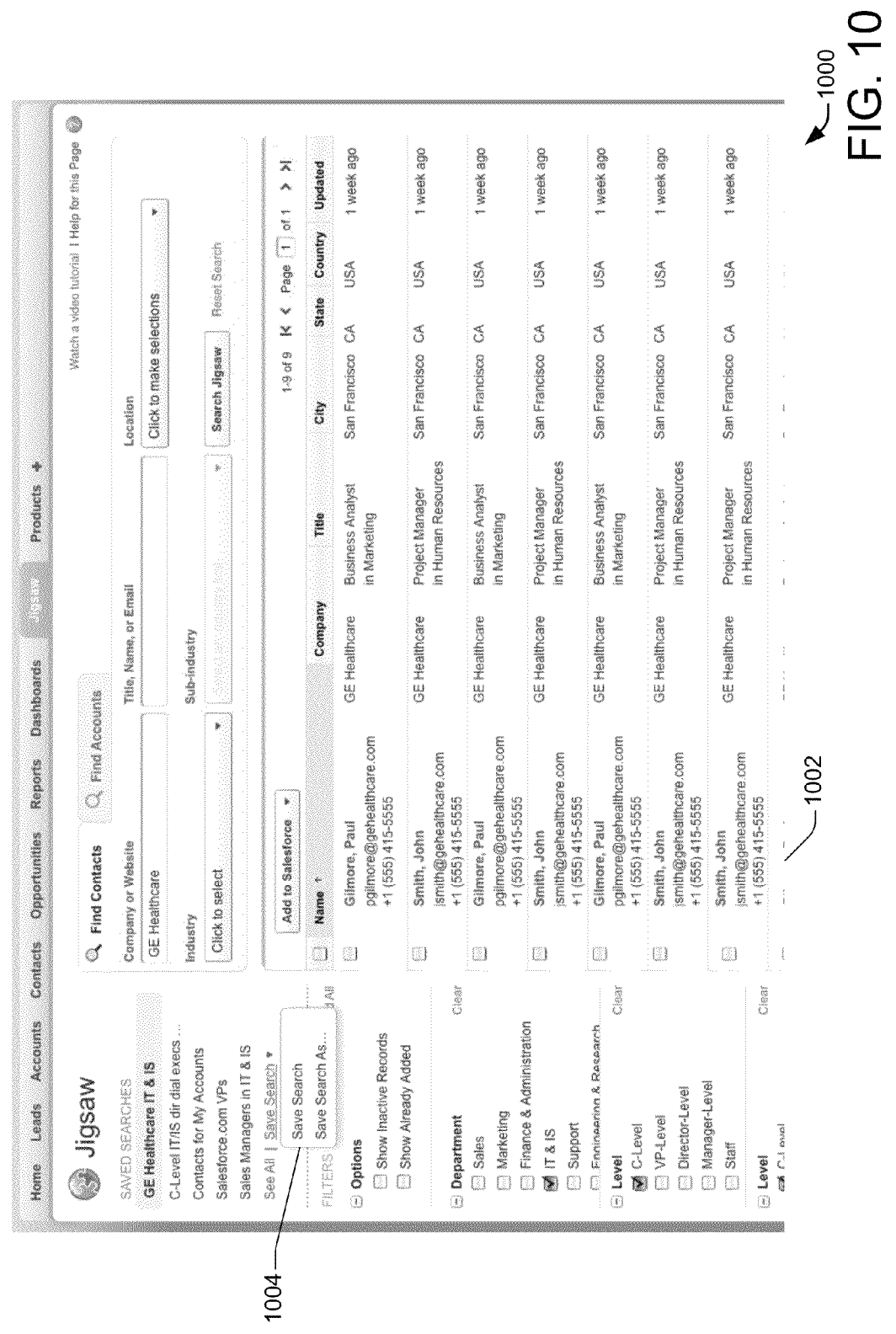

FIG. 10 illustrates an example of an image 1000 of a user interface that may be used to store search parameters in accordance with some implementations of method 200. As illustrated by data field 1002, the results of a search based on search and filter parameters may be displayed at a user interface. In various implementations, data field 1004 may be used to save the search and filter parameters, as well as the results of the search. In this instance, data field 1004 provides the user with the option to save the search for future use. Thus, according to various implementations, a user may provide an input to data field 1004, such as selecting "Save Search As," and save the search and filter parameters as well as the search results. The saved search results and parameters may be recalled at a future time. Moreover, in some implementations, a user may specify where a data object including the saved search should be stored. For example, the user may specify that the search results should be stored in a virtual portion of a database system associated with the user, or stored at a local computer system associated with the user.

Figure 3:
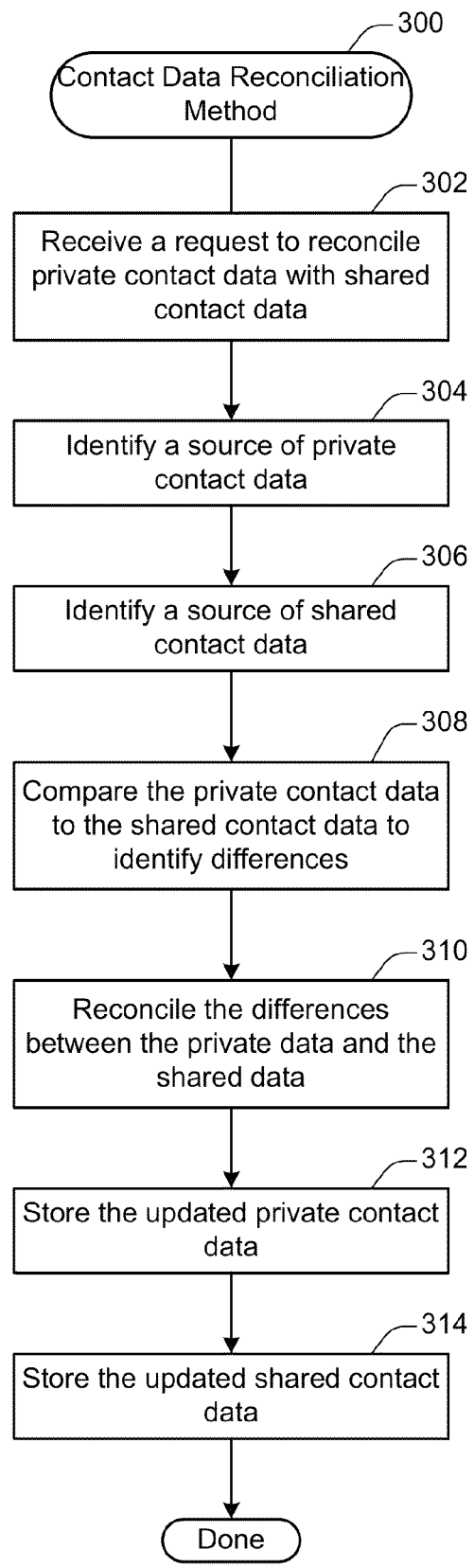
FIG. 3 shows a flowchart of an example of a contact data reconciliation method 300, performed in accordance with some implementations.

FIG. 3 shows a flowchart of an example of a contact data reconciliation method 300, performed in accordance with some implementations. In various implementations, the method 300 may be used to receive a request to reconcile private contact data with shared contact data, compare the private contact data to the shared contact data to identify differences, and reconcile the differences between the private contact data and the shared contact data. Thus, data reconciliation method 300 may be used to integrate contact data aggregated from several sources with a user's private contact data in order to enrich the user's private contact data.

In FIG. 3, at block 302, a request to reconcile private contact data with shared contact data may be received. In various implementations, reconciling the private contact data with the shared contact data may comprise a process in which differences between the two sets of data are resolved to create a unified data set. In some implementations, the request to reconcile private contact data may be issued by a user of a database service provided by a database service provider. The user may issue the request to reconcile the user's private contact data in order to import additional contact information into the user's private contact data from shared contact data, or to evaluate and reconcile differences between the private contact data and the shared contact data.

Figure 11:
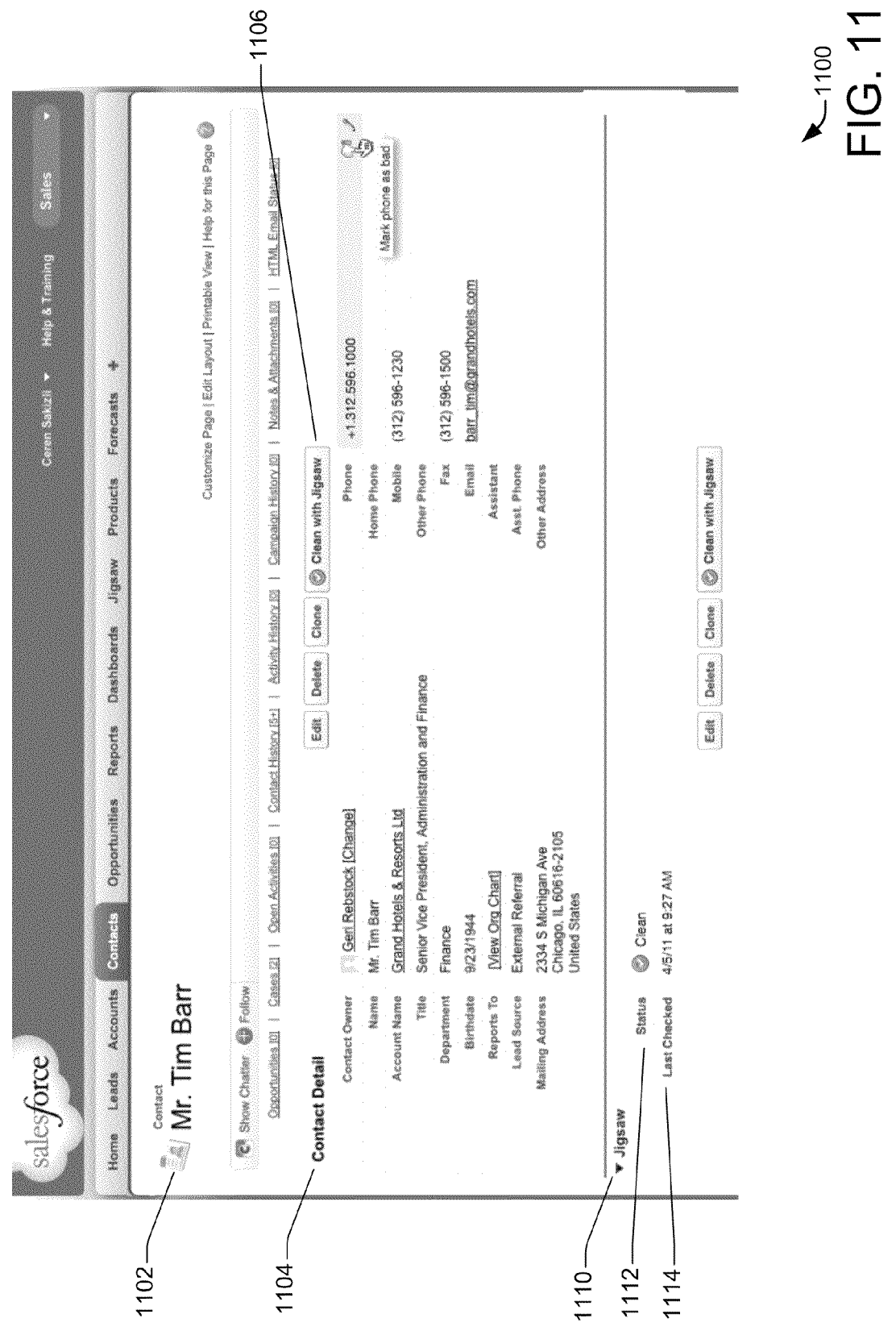

FIG. 11 illustrates an example of an image 1100 of a user interface that may be used to issue a request to reconcile private contact data with shared contact data in accordance with some implementations of method 300. In some implementations, image 1100 may present a user with private contact data. Thus, image 1100 may display information associated with a specific entity or contact. For example, data field 1102 may display information regarding the identity of the entity or contact with which the displayed private contact data is associated. In this instance, data field 1104 displays various private contact data items, such as a title, department, birthdate, mailing address, and phone number. Data field 1102 indicates that the information is associated with a contact named "Tim Barr."

Data field 1106 may present the user the option of reconciling the user's private contact data, as identified by data field 1102, with shared contact data that has been aggregated from several other users. In this instance, data field 1106 provides the user with a button. If the user selects the button, a request to reconcile the private contact data with the shared contact data may be issued to the database service provider.

Data field 1110 may provide information about previously issued requests to reconcile data. Thus, in some implementations, data field 1110 may provide historical information about previous data reconciliations. In various implementations, data field 1110 may also indicate whether or not a request to reconcile data should be issued. For example, data field 1110 may include data field 1112, which may provide the user with an indication of the status of the private contact data. The status may refer to whether or not any discrepancies between the user's private contact data and the shared contact data exist. In this instance, data field 1112 indicates a status of "Clean." Accordingly, the status identified by data field 1112 indicates that the private contact data is consistent with the shared contact data because no differences exist. Thus, the information stored in the private contact data is as current as possible. In various implementations, data field 1112 may also indicate that the status of the private contact data is not "Clean." Accordingly, data field 1112 may indicate that more recent, or different, information is available from the shared contact data, and the contact data should be reconciled. Data field 1110 may also include data field 1114, which may provide additional historical information about the reconciliation process. For example, data field 1114 may indicate when the last request to reconcile data was issued, and when the status of the private contact data was last checked.

Returning to FIG. 3, at block 304, a source of private contact data may be identified. In various implementations, the source of the private contact data is the location at which the private contact data is stored. As previously discussed with reference to FIG. 2, block 212, the private contact data may be stored locally or remotely. For example, the private contact data may be stored at a computer system or mobile device used by the user. Moreover, the private contact data may be stored remotely in a multi-tenant database system operated and maintained by a database service provider.

In FIG. 3, at block 306, a source of shared contact data may be identified. In various implementations, the source of the shared contact data is the location at which the shared contact data is stored. As previously discussed with reference to FIG. 1, block 114, the shared contact data may be stored in a virtual portion of a multi-tenant database system operated and maintained by the database service provider. Thus, according to various implementations, the database service provider may identify the source of the shared contact data by determining the location at which the shared contact data is stored.

In some embodiments, the source of the shared contact data may further refer to a particular record or data object that stores shared contact data items relevant to the private contact data that is the basis of the reconciliation. For example, the source of the shared contact data may refer to a record that stores shared contact data items for a particular contact. In some implementations, the source of the shared contact data may be a plurality of records or data objects.

Figure 12:
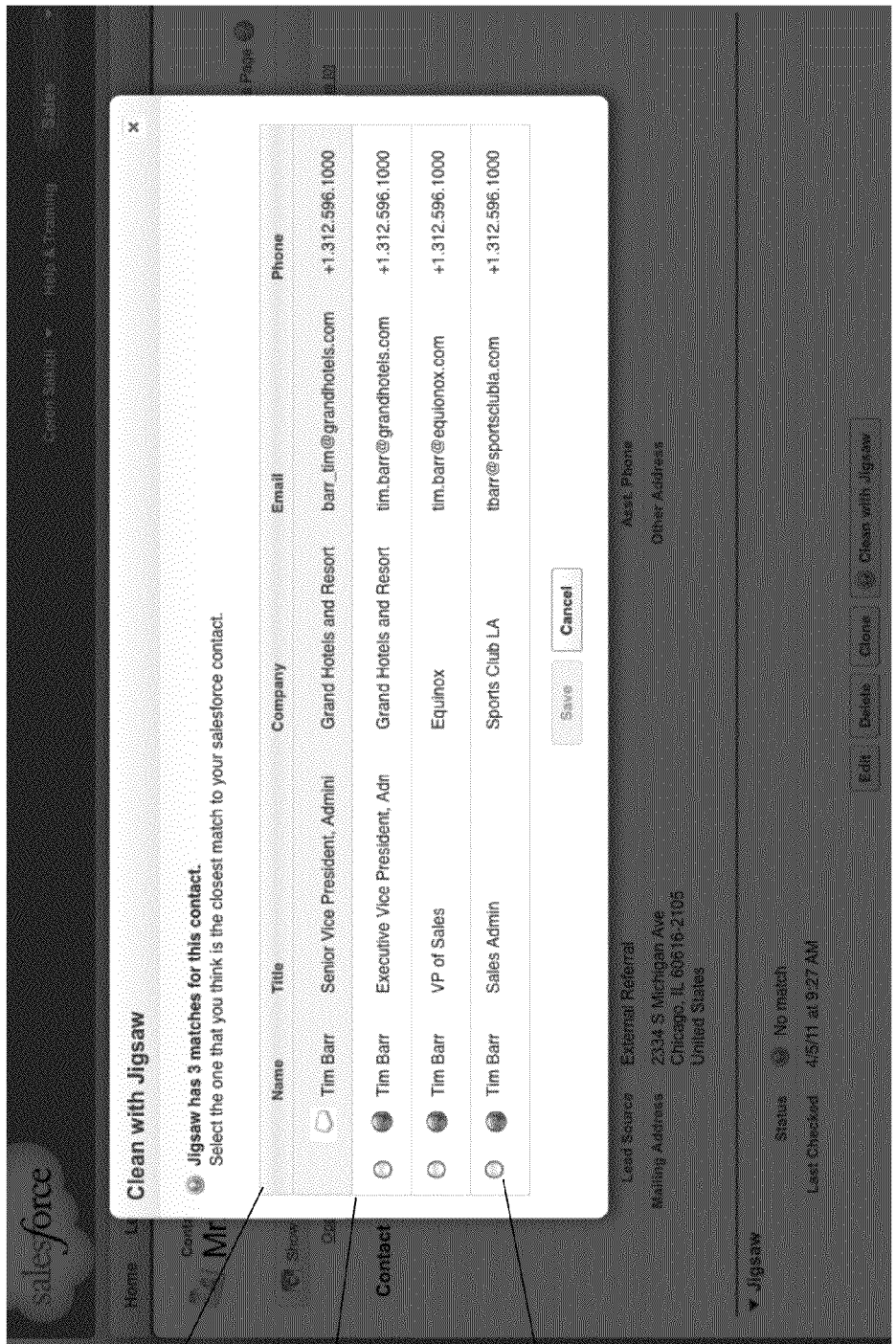
FIG. 12 illustrates an example of an image 1200 of a user interface that may be used to identify a source of shared contact data in accordance with some implementations of method 300.

FIG. 12 illustrates an example of an image 1200 of a user interface that may be used to identify a source of shared contact data in accordance with some implementations of method 300. Data field 1202 may display information about identified private contact data that may form the basis of the reconciliation process. In this instance, data field 1202 displays the name, title, company, email address, and phone number of the contact associated with the identified private contact data. Data field 1204 may display different sources of shared contact data that are available and that may be reconciled with the private contact data. In this instance, the sources are different records storing shared contact data. The user may determine which source of the shared contact data is relevant to reconciling the identified private contact data based on the information displayed in data field 1202. In this instance, each of the records is associated with a contact named "Tim Barr." However, each of the records has varying contact information. The user may identify which record is most relevant, and choose to reconcile the user's private contact data with the identified record.

Data field 1206 may receive an input that identifies which source of shared contact data should be used to reconcile the private contact data with the shared contact data. In this instance, the data field provides a button capable of receiving a selection of from the user. Thus, in various implementations, the user may select a source of shared contact data that should be reconciled with the private contact data by selecting the appropriate button corresponding to that data source.

Returning to FIG. 3, at block 308, the private contact data may be compared to the shared contact data. Differences between the private contact data and the shared contact data may be determined based on this comparison. For example, private contact data items associated with a contact, such as a sales representative employed by a company, may be stored in a first record as private contact data. The first record may include a plurality of data fields storing the various contact data items associated with the sales representative. For example, the first record may store the sales representative's business address and email address. However, the record might not include the sales representative's business phone number. A second record associated with the sales representative may be stored in the shared contact data. The second record may include the sales representative's business phone number. Thus, according to various implementations, when the first record stored as private contact data is compared to the second record stored as shared contact data, a difference between the first and second may be identified. The difference may indicate that the shared contact data includes the sales representative's business phone number, while the private contact data does not.

In various implementations, a report based on the comparison of the private contact data with the shared contact data may be provided. The report may provide metadata regarding the comparison. Thus, the report may provide an overall indication of how a user's private contact data compares to the shared contact data. For example, the report may indicate how many duplicate contact data items are present (i.e. present in both the private contact data and shared contact data). The report may also indicate how many records associated with contacts are missing information and do not have a contact data item for a particular field. The report may further indicate how much of the user's contact data is incorrect. This may be based on an overall determination of how many shared contact data items conflict with or have different values than the private contact data items. As similarly discussed with reference to FIG. 1, blocks 106 through 110, the credibility of both the shared contact data items and the private contact data items may be used to determine how many of the conflicting private contact data items are less credible than the shared contact data items, and thus incorrect.

Figure 13:
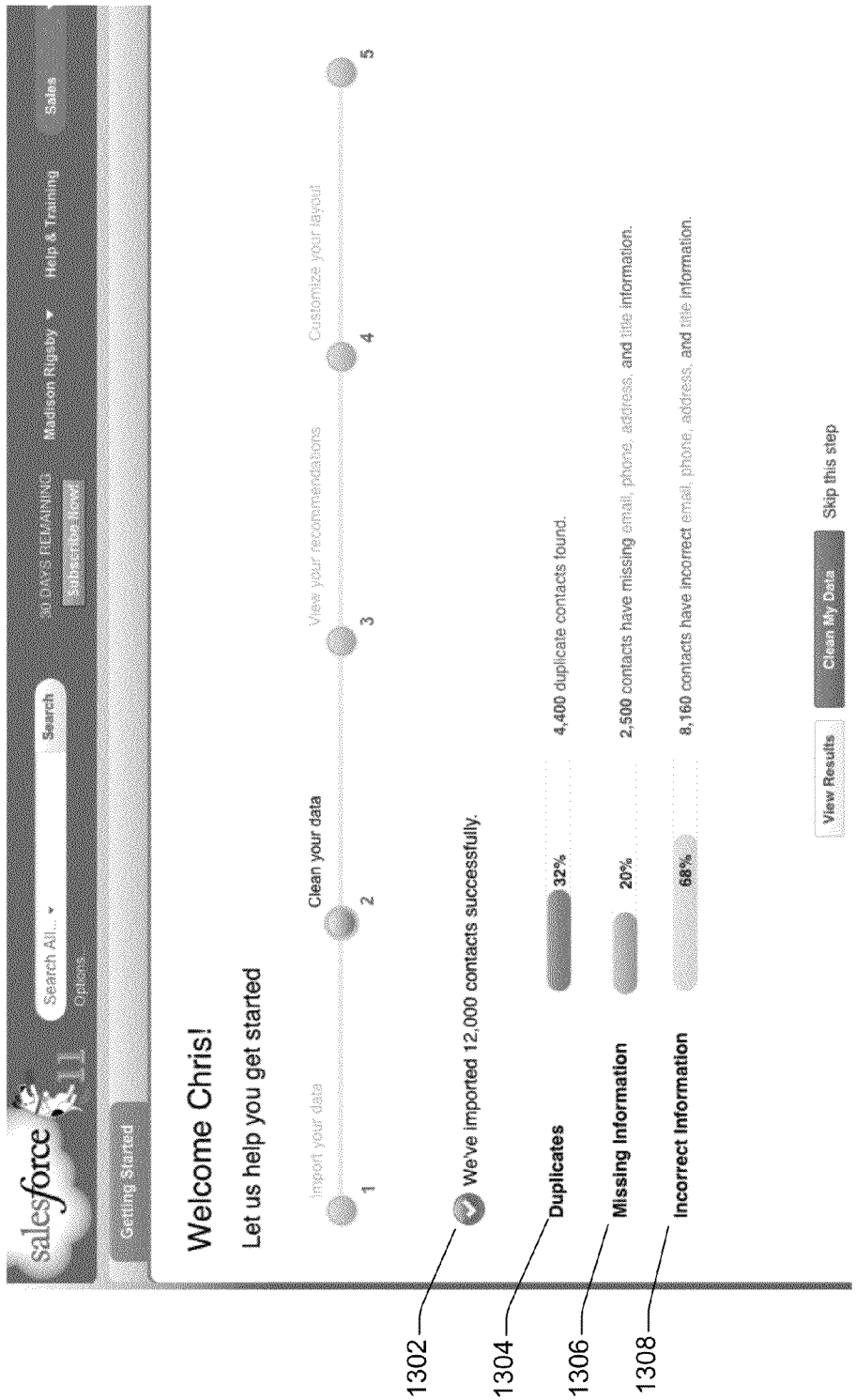
FIG. 13 illustrates an example of an image 1300 of a user interface that may provide a report about the contact data reconciliation in accordance with some implementations of method 300.

FIG. 13 illustrates an example of an image 1300 of a user interface that may provide a report about the contact data reconciliation in accordance with some implementations of method 300. The report displayed in image 1300 may be provided to a user after the reconciliation process has been completed. Data field 1302 may display information summarizing the results of the reconciliation process. In various implementations, data field 1302 displays the number of contacts for which shared contact information was imported and stored as private contact data. In this instance, data field 1302 indicates that contact data was imported for 12,000 contacts.

Data field 1304 may provide additional information about the contact data that was imported. In various implementations, data field 1304 may identify how many shared contact data records were already present in the private contact data. In this instance, data field 1304 may identify these occurrences as "Duplicates." Data field 1304 may represent the number of duplicate entries as a percentage, or a raw number. In this instance, 4,400 duplicate contacts were found.

Data field 1306 may provide information about deficiencies of the private contact data after the reconciliation process. In this instance, data field 1306 identifies such deficiencies as "Missing Information." Data field 1306 may represent the missing information as a percentage of missing contact data. The percentage may be based on a relationship between the total number of records capable of storing private contact data items and the number of those records that include empty data fields. In addition to providing a percentage, data field 1306 may provide a raw number of contacts that have missing information. In this instance, 2500 contacts have missing contact information.

Data field 1308 may provide information about the differences between the private contact data and the shared contact data. In this instance, data field 1308 identifies the differences as "Incorrect Information." Data field 1308 may represent the differences as a percentage based on a relationship between the total number of data fields storing private contact data and the number of private contact data items that conflict with the shared contact data and have been deemed less credible than the shared contact data. Furthermore, data field 1308 may provide a raw number of conflicting contact data items that were found. In this instance, 8,160 contacts had contact data that conflicted with the shared contact data and was less credible than the shared contact data.

Figure 14:
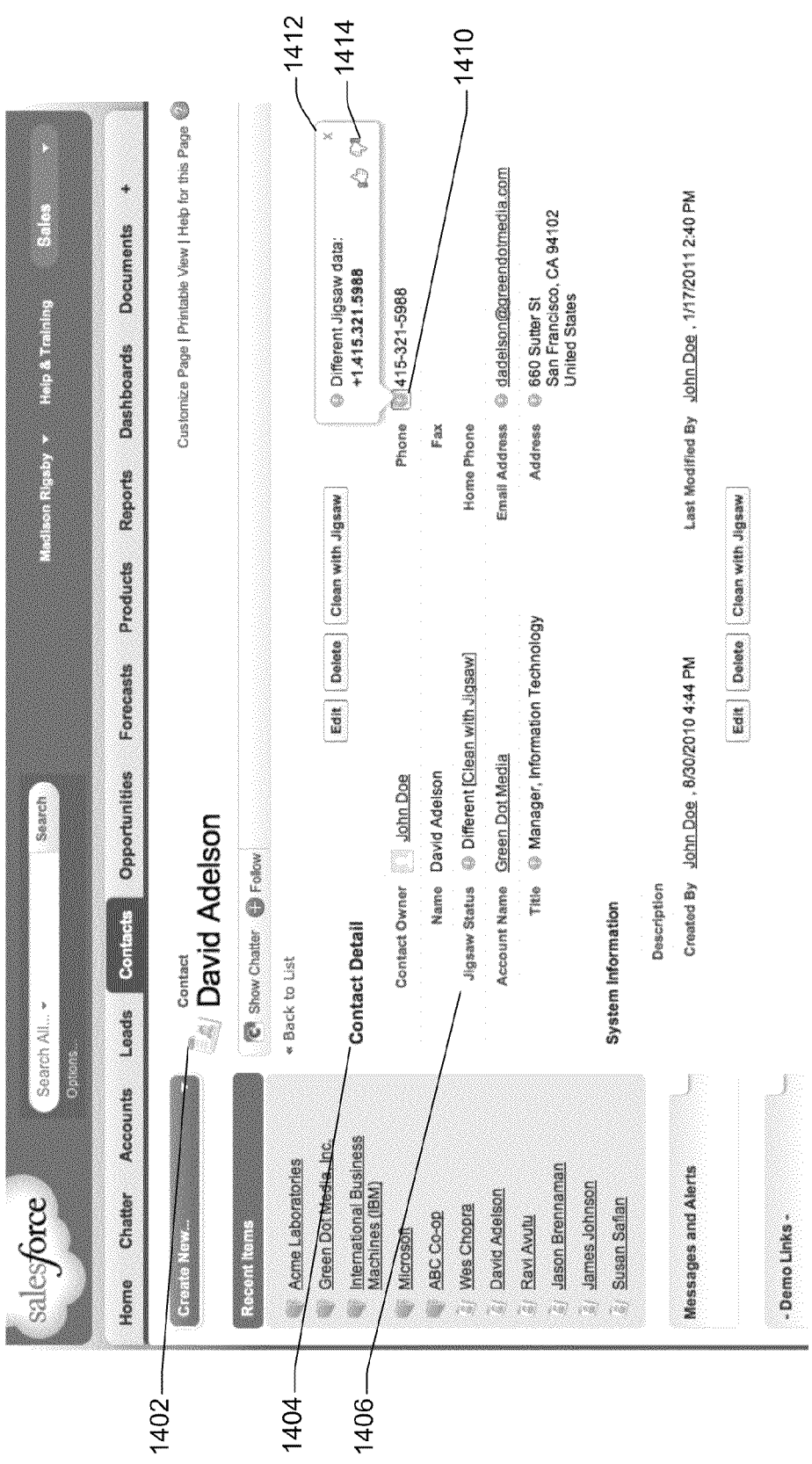
FIG. 14 illustrates an example of an image 1400 of a user interface that presents differences between the private contact data and the shared contact data in accordance with some implementations of method 300.

In various implementations, the indication of differences between the private contact data and the shared contact data may be presented as a side by side comparison displayed at the user interface. FIG. 14 illustrates an example of an image 1400 of a user interface that presents differences between the private contact data and the shared contact data in accordance with some implementations of method 300. As discussed above with reference to FIG. 11, at data field 1102, data field 1402 may display information regarding the identity of the entity or contact with which the displayed private contact data is associated. Data field 1404 may display various private contact data items, such as a title, mailing address, email address, fax number, and phone number.

Data field 1404 may include data field 1406. Data field 1406 may display information identifying the status of the private contact data. The status may refer to whether or not the private contact data is consistent with or the same as the shared contact data. Thus, according to various implementations, data field 1406 may provide an overall indication of whether or not the private contact data associated with a contact, in this instance "David Adelson," is the same as the identified shared contact data associated with this contact. In this instance, because differences exist between the data sets, data field 1406 indicates a status of "different." Moreover, data field 1406 may further present the user the option of reconciling all data associated with the contact.

Data field 1404 may also include data field 1410. Data field 1410 may provide an indication of whether or not a specific private shared contact data item associated with a contact is consistent with or the same as the corresponding shared contact data item stored in a shared contact data record associated with the contact. Thus, in various implementations, data field 1410 may display status information associated with a single private data contact item. In this instance, there is a difference between a phone number stored in the private contact data associated with "David Adelson" and the shared contact data associated "David Adelson." In response to being presented with the indication of this difference, the user may select to reconcile the difference by replacing the private contact data with the shared contact data.

In some implementations, the user may choose to view the shared contact data before choosing to reconcile the differences. Accordingly, in various implementations, data field 1412 may be presented to the user in response to receiving the selection to reconcile the difference. Data field 1412 may display the shared contact data item that is different from the private data contact item. In this instance, the shared contact data includes a phone number that is different from a phone number stored in the private contact data. The user may compare the two contact data items and determine how to reconcile the difference between the two.

Returning to FIG. 3, at block 310, the differences between the private contact data and the shared contact data may be reconciled. Reconciliation may be performed by the user. Thus, according to various implementations, the user may be presented with an indication of differences between the private contact data and the shared contact data, and in various implementations, the user may reconcile differences between the two sets of data by selecting which data should be retained. Returning to FIG. 14, the user may reconcile the differences by providing an input to data field 1414. The input received by data field 1414 may identify whether the private contact data or the shared contact data should be stored. In this instance, data field 1414 provides the user with a "thumbs up" and a "thumbs down." If the user selects the "thumbs up," the user has indicated that the phone number stored in the shared contact data item is good, and should be stored instead of the private contact data already stored in the user's private contact data. If the user selects the "thumbs down," the user has indicated that the phone number stored in the shared contact data item is bad, and should not be stored instead of the user's private contact data.

In some implementations, settings may be used to determine how and when reconciliation of differences between shared contact data and private contact data occurs automatically. For example, if a particular difference, such as missing private contact data, is identified, a specific action may be taken to reconcile the difference. In various implementations, the action may be taken automatically by the database service provider. In one example, a user's private contact data may be missing a contact data item that identifies an occupational title associated with a sales representative that the user is currently negotiating with. However, shared contact data associated with the sales representative may include a contact data item that identifies the occupational title of the user. The occupational title of the sales representative may be of value to the user because it provides additional information about the sales representative's position in the hierarchy of the sales representative's organization. A setting may indicate that this difference should be reconciled by automatically importing the shared contact data item into the private contact data. In various implementations, the user may determine the setting.

Figure 15:
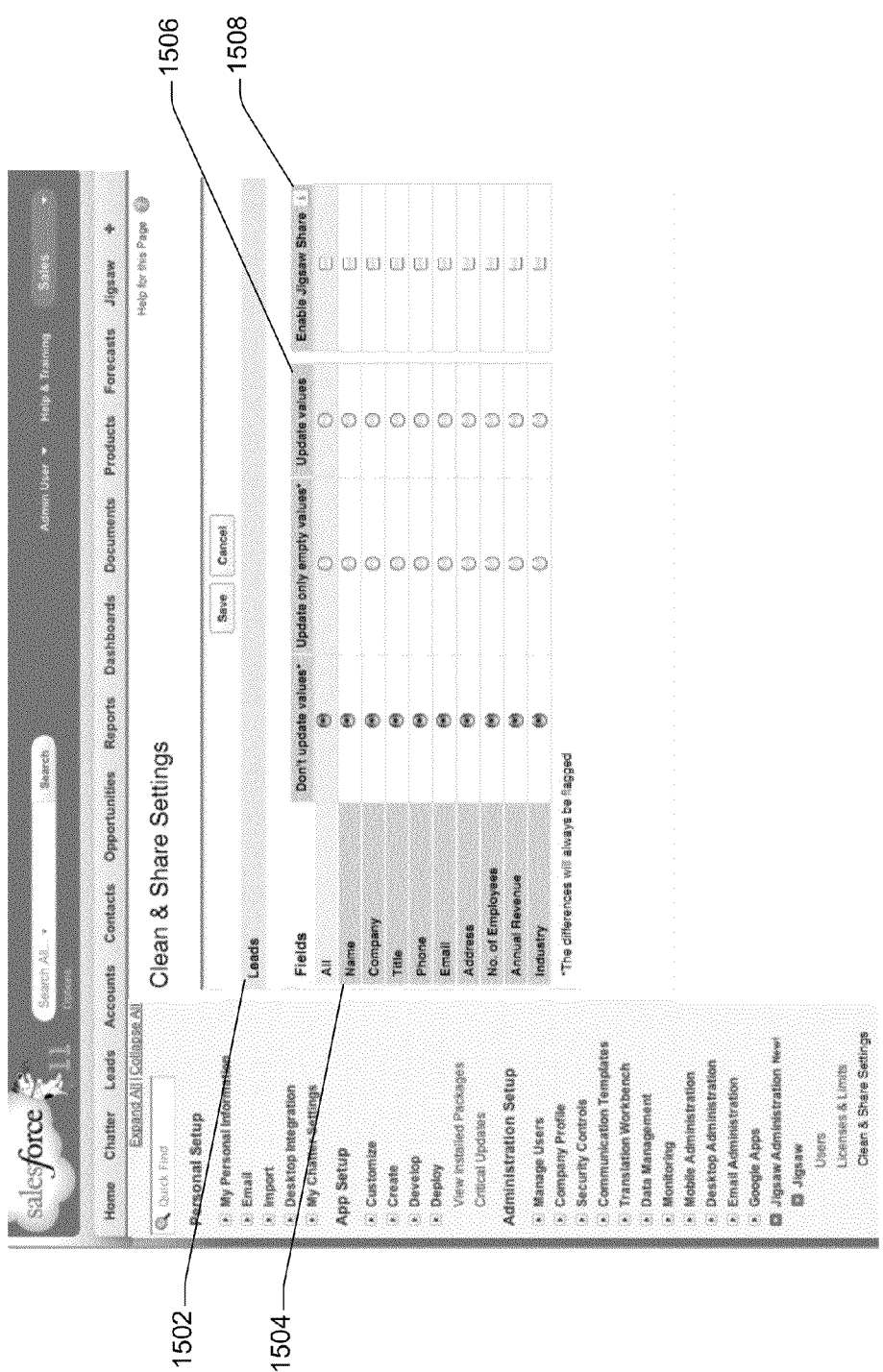
FIG. 15 illustrates an example of an image 1500 of a user interface that may be used to select and store settings associated with the reconciliation of the shared contact data with the private contact data in accordance with some implementations of method 300.

FIG. 15 illustrates an example of an image 1500 of a user interface that may be used to select and store settings associated with the reconciliation of the shared contact data with the private contact data in accordance with some implementations of method 300. In various implementations, the settings may be particular to a type of record. For example, a first set of settings may be stored and applied to Contacts, while a second set of settings is stored and applied to Groups. Data field 1502 may display information identifying which type of record the settings are applicable to. In this instance, data field 1502 indicates that the settings displayed in image 1500 are applied to "Leads." Data field 1504 may include several data fields that may be associated with data fields particular to a type of record used to store contact data items. For example, data field 1504 may include a field associated with the name of a contact.

Data field 1506 may include several settings associated with the data field identified by data field 1504. The settings may identify actions to be taken in specific circumstances. Thus, the settings may identify when private contact data should be updated with, or overwritten by, shared contact data. In this instance, the actions identified in data field 1506 are "Update values," "Update only empty values," and "Don't update values." Accordingly, the values stored in the private contact data may always be updated automatically upon initiation of the reconciliation process, only if the corresponding data item stored in the private contact data is empty, or not automatically updated at all. Data field 1506 may receive an input from the user that selects a setting for a data field identified by field 1504.

Data field 1508 may provide a data field capable of receiving a selection to share the private contact data with the shared contact data. Thus, in addition to determining to retain the user's private contact data instead of replacing it, the user may further decide to share the private contact data with the shared contact data stored by the database service provider. In this instance, data field 1508 provides a plurality of checkboxes. Each checkbox may be associated with a data field identified by data field 1504. If a checkbox is selected, the private contact data item stored within the data fields may be communicated to the shared contact data, and incorporated into the shared contact data if deemed credible, as previously discussed with reference to process 100.

Returning to FIG. 3, at block 312, the updated private contact data may be stored. As previously discussed with reference to FIG. 3, block 304, the private contact data may be stored locally or remotely. Thus, according to various implementations, the updated private contact data that has been reconciled with the shared contact data may also be stored locally or remotely.

In FIG. 3, at block 314, updated shared contact data may be stored. Thus, according to various implementations, the user's selection may be used to determine whether or not the shared contact data should be updated. If the user determines that the user's own data should be stored in the private contact data and that the shared contact data value should be discarded, the database service provider may perform a credibility determination as discussed with respect to FIG. 1, blocks 106 through 114, to determine if the user's private contact data is more credible than the shared contact data. If it is determined that the user's private contact data is more credible, the shared contact data may be updated with the private contact data, and the updated shared contact data may be stored by the database service provider in a database system associated with the database service.

Figure 4:
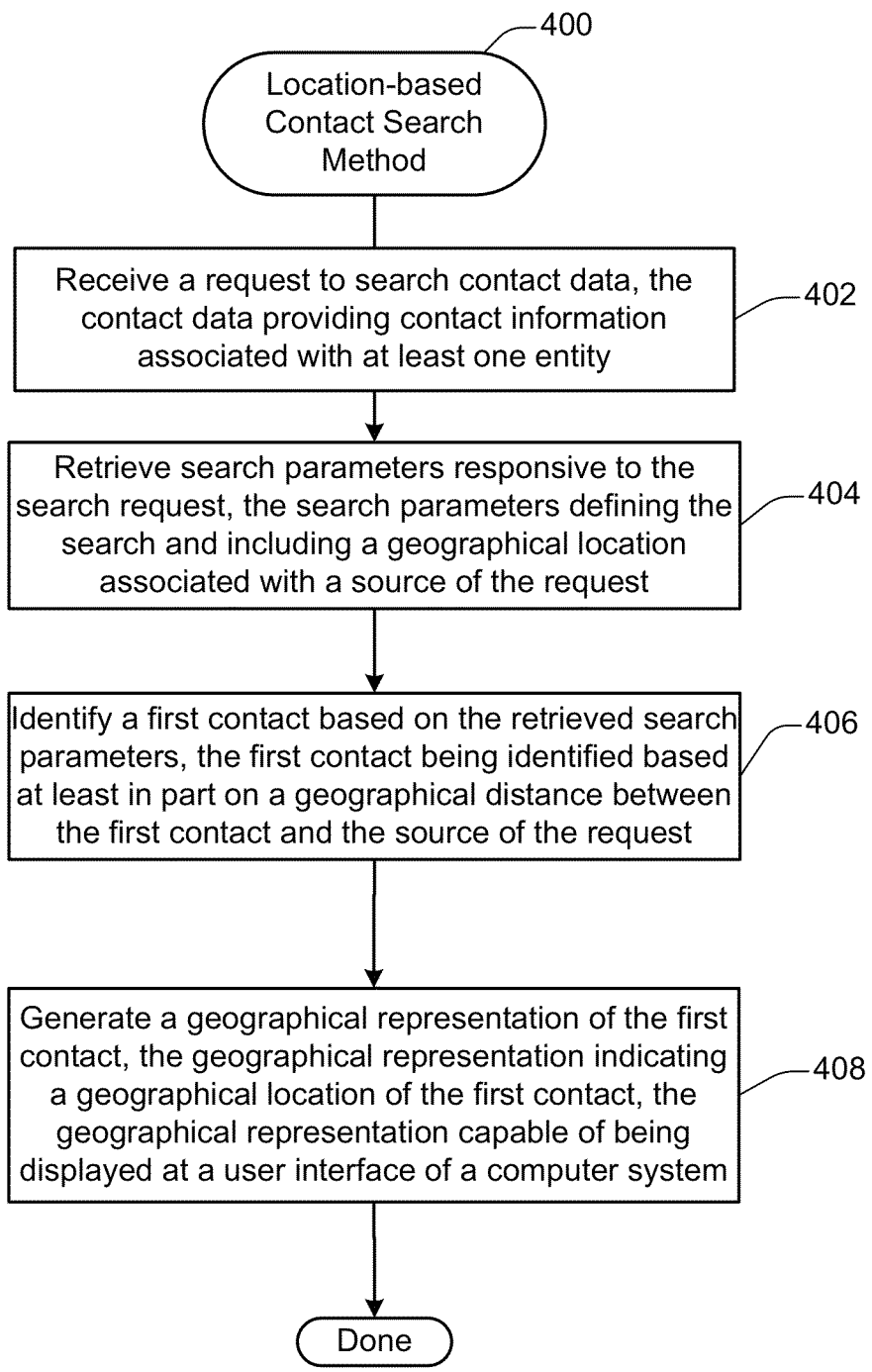
FIG. 4 shows a flowchart of an example of a location-based contact search method 400, performed in accordance with some implementations.

FIG. 4 shows a flowchart of an example of a location-based contact search method 400, performed in accordance with some implementations. Location-based contact search method 400 may be used to search for and identify contacts based on a user's location as well as various other parameters. Thus, contact data may be searched in order to identify contacts that are relevant to the user's search and within the user's geographical proximity. The contacts may be displayed to the user at a user interface of a computer system or mobile device. Thus, the user may be presented with a geographical representation, such as a graphical presentation of a map displayed as a component of the user interface, that identifies several contacts within the user's proximity. The geographical representation may further display contact information associated with each identified contact. Thus, according to various implementations, if a user arrives in a new or unfamiliar location, location-based contact search method 400 may be performed to search for and identify contacts within the user's geographical vicinity and provide the user with contact information associated with each of the identified contacts.

In FIG. 4, at block 402, a request to search contact data may be received. As previously discussed with reference to shared contact data maintenance method 100, the contact data may provide contact information associated with at least one entity. In various implementations, a request to search contact data may be issued by a user of a database service. The user may issue the request when the user wishes to find contacts within the user's vicinity. For example, a user may be a salesperson. The salesperson may be responsible for contacting sales opportunities in a particular geographical area. The salesperson may be aware of one or two contacts within the area, but may want to identify more contacts in order to secure more sales opportunities. In various implementations, the salesperson may be a user of a database service provided by a database service provider. In some implementations, the user may issue a request to the database service provider to perform a location-based search of contact data in order to identify more contacts within the salesperson's geographical area. In various implementations, the request may be issued via a user interface displayed on a computer system or mobile device.

In FIG. 4, at block 404, search parameters associated with the contact data may be retrieved. For example, the search parameters can be generated in response to the request of block 402 or previously defined and stored on an accessible storage medium. In various implementations, the search parameters may guide the search and define the results returned by the search. Thus, the user may identify search parameters, such as an occupational title or a company name, that should be used to search for and identify additional contacts. Furthermore, according to various implementations, the search parameters may include a geographical location associated with a source of the request. In various implementations, the source of the request is the user of block 402. In some implementations, the source of the request may be a computer application provided by a database service provider. In various implementations, the computer application may be run by the user, and may issue the request in response to an input provided by the user. The input may be, for example, a request to find additional contacts in the user's immediate vicinity. In some implementations, the computer application may issue the request as part of an automated process. Thus, the request may be issued independent of an input provided by the user. According to some implementations, the search parameters may include the user's geographical location. Furthermore, the search parameters may also include the geographical location of the contacts that are searched. Based on this information, the database service provider may determine a distance between the user and an identified contact and use the distance to determine whether or not the contact should be returned as a result of the search.

In FIG. 4, at block 406, a first contact may be identified based on the retrieved search parameters. In some implementations, the first contact is identified based, at least in part, on a geographical distance between the first contact and the source of the request. Thus, according to various implementations, the contact data may be searched based on the previously determined parameters. In some implementations, the contact data may be shared contact data that is crowd sourced contact data. The shared contact data may be contributed to by multiple entities, such as other users of the database service, thus providing the user access to contact information the user was not previously aware of. The shared contact data may be searched based on the search parameters in order to identify contacts with associated contact data records that satisfy the determined search parameters. For example, if a company name, such as "Acme Inc." was retrieved as a search parameter, contact records storing the keyword "Acme" may be returned as results of the search. Furthermore, a designated geographical distance may also be used to identify contacts and associated contact data records. If a contact is within a designated distance, it may be identified as a result of the search. For example, a user may specify that only contacts within 10 miles of the user should be identified. In this instance, the search may return only contacts that are located within 10 miles of the user's present location.

In FIG. 4, at block 408, a geographical representation of the first plurality of contacts may be generated. In various implementations, the geographical representation indicates a geographical location of the first contact. In various implementations, the geographical representation is capable of being displayed at a user interface of a computer system. Thus, the user may be presented with a graphical presentation such as a map of the identified contact and its location with respect to the user's location. Thus, in some implementations, if the more than one contact is identified, the user may be presented with an indication of which contacts are closer and more accessible. Furthermore, if the user moves to a new location, the search results may be updated automatically, and the user may be notified by an automated message of any new contacts that have been identified and are near the new location.

Figure 5:
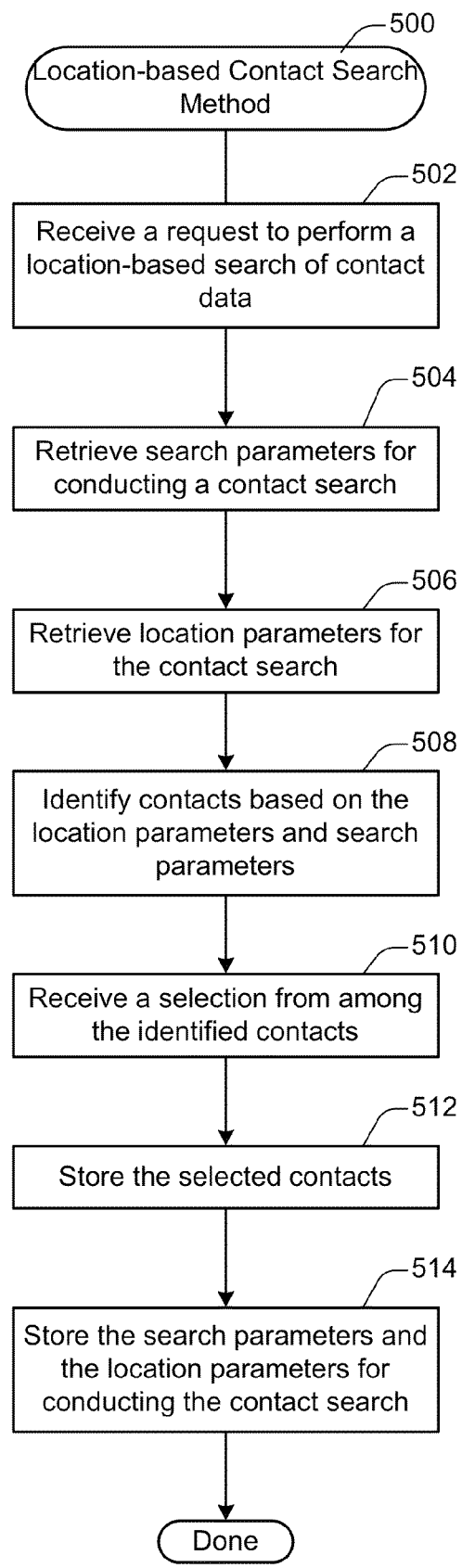
FIG. 5 shows a flowchart of another example of a location-based contact search method 500, performed in accordance with some implementations.

FIG. 5 shows a flowchart of another example of a location-based contact search method 500, performed in accordance with some implementations. In various implementations, location-based contact search method 500 may be used to determine search parameters for conducting a contact search, determine location parameters for conducting the contact search, identifying contacts based on the parameters, and storing a selection of identified contacts as well as the search parameters and location parameters that were used to conduct the search.

In FIG. 5, at block 502, a request to perform a location-based search of contact data may be received. As previously discussed with respect to FIG. 4, block 402, in various implementations, a user may issue a request in order to identify contacts that are located near the user's present location. In various implementations, the user may issue the request to perform a location-based search via a computer application provided by a database service provider. Thus, according to various implementations, the request may be received by the database service provider via a message sent by the computer application.

In various implementations, the request may be issued by an automated process. In various implementations, the automated process may be a process or component of a computer application that is part of an on-demand database service provided by a database service provider. In some implementations, the computer application may be run remotely by a computer system operated by the database service provider. In various implementations, the computer application may be run locally on a computer system or mobile device operated by the user. According to various implementations, the automated process may be an automated search function. Thus, the automated search function may issue the request upon starting the application, or issue the request as part of the routine operation of the program, such as updating results provided by a previous search, as discussed in greater detail below with reference to FIG. 5, block 512.

Figure 16:
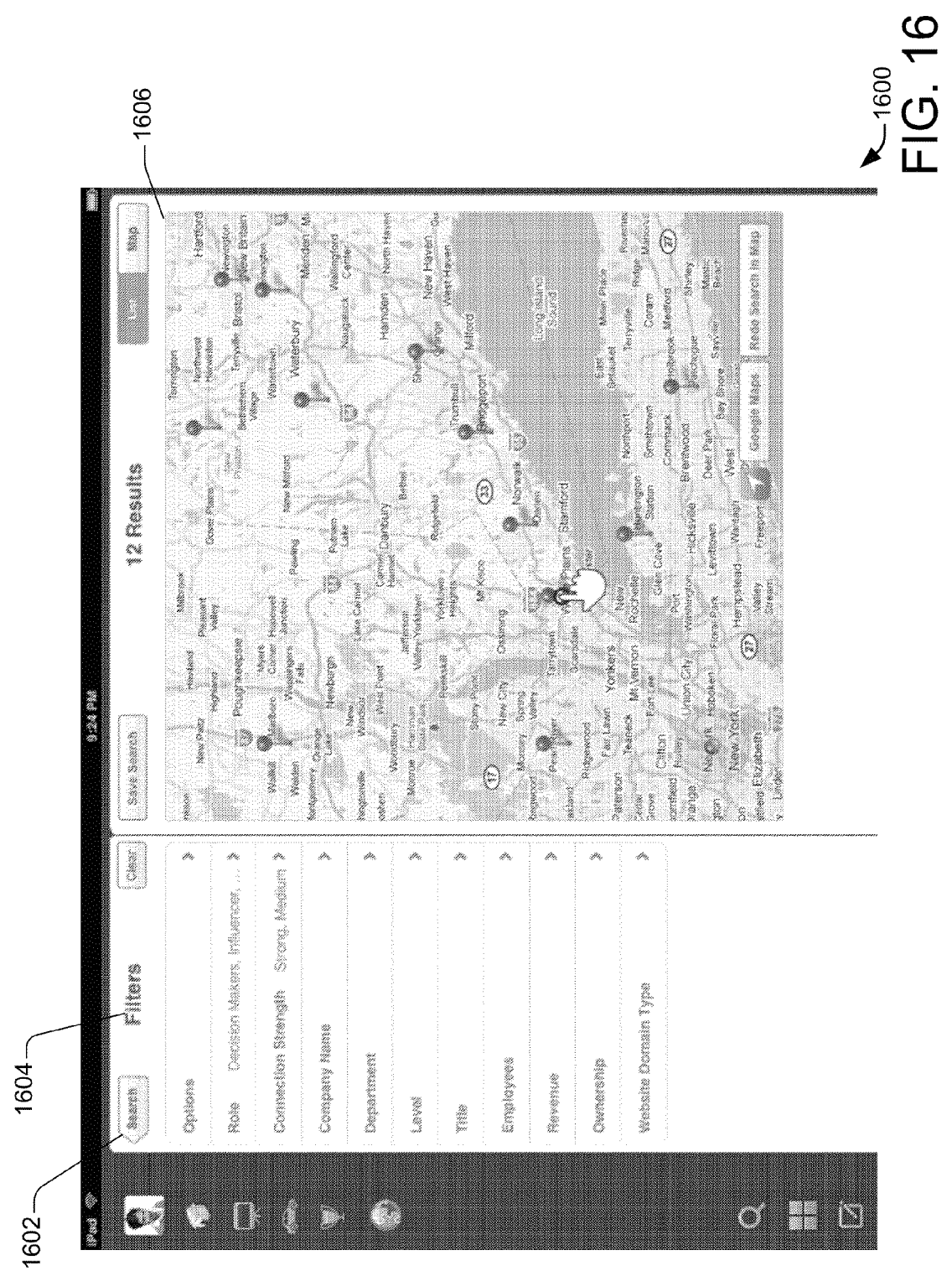

FIG. 16 illustrates an example of an image 1600 of a user interface that may be used to request a location-based search of contact data, in accordance with some implementations. In various implementations, image 1600 may include data fields 1602, 1604, 1606, and 1608. In some implementations, data field 1602 is a graphical "Search" button capable of being selected by a user, for instance, by touching when the user interface is displayed on a display device having a touchscreen. The input may indicate that a location-based search for contacts should be conducted.

Returning to FIG. 5, at block 504, search parameters for conducting a contact search may be retrieved. As similarly discussed with reference to FIG. 4, block 402, the search parameters may be generated in response to the request of block 502 or previously defined and stored on an accessible storage medium. Thus, according to various implementations, the search parameters may be determined prior to conducting the search in order to guide the search and define the results provided by the search. In various implementations, as discussed with reference to FIG. 2, block 204, a search parameter may be a parameter that identifies contact data items that are relevant to the user's request. In this way, one or more search parameters may define the results of the search. In various implementations, the search parameter may be associated with a specific data field of one or more contact data records used to store contact data. For example, a contact record may be configured to store a particular type of contact data item in a data field. In one example, the data field may be configured to store a company name. If the search parameter identifies a value that is a company name, the search parameter may indicate that the contact data record's data field that is configured to store a company name should be queried for the particular type of contact data item (i.e. the company name). A comparison of the value and a contact data item stored in the associated data field of the contact data record may determine whether or not the contact data record should be included in the results of the location-based contact search.

In various implementations, search parameters may identify biographical information associated with contacts. For example, the biographical information may be a name, a phone number, an email address or portion thereof, an address, and the name of a company that employs the contact. In one example, the search parameter may identify a value representing a company name, such as "Acme, Inc." If a contact record includes a data field at least partially identifying the contact's company and storing a matching value of "Acme", the contact record may be included in the results of the search.

In some implementations, search parameters may identify a role associated with a contact. A role may be a role associated with a contact that describes the contact's interactions with other contacts that may be included in the organization. In various implementations, actions taken by a contact and interactions with other contacts may be stored as data objects in a record as the contact's activity history. For example, an action in which a contact changes the status of a case from "open" to "closed' may be tracked by a database service provider. In response to the change occurring, the database service provider may create a data object storing one or more data values identifying the contact and the action. The data object may be stored within the record, or as a child object, as part of the contact's activity history. According to some implementations, data objects included in the contact's activity history may be retrieved from shared contact data as well as other crowd sourced data. Thus, actions and interactions involving the contact may be identified based on data contributed to by several entities, such as other users of the database service.

In various implementations, the database service provider may use the contact's activity history to determine the contact's role. The database service provider may implement a machine algorithm, such as Radian 6™ provided by Salesforce.com™, that determines one or more patterns within the contact's activity history, and identifies a designated role based on the determined one or more patterns. For example, if a contact's activity history includes several actions in which the user made final decisions regarding several sales projects or opportunities associated with an organization, that contact may have an associated role of "decision maker." Thus, in one example, a user may select a search parameter that identifies a value of "decision maker." If a contact record includes a data field identifying the contact's role and storing a matching value of "decision maker" the contact record may be included in the results of the search.

Returning to FIG. 16, data field 1604 may display various parameters which may be used to filter the contacts returned by the search. For example, the contacts that may be returned by the search may be filtered according to company name, department, level within an organization, occupational title, role, and connection strength. In various implementations, data field 1604 may be capable of receiving an input for a user that indicates that a particular filter should or should not be applied. Thus, a user may provide an input to data field 1604 in order to select and apply various search parameters and filters to the contacts returned by the search.

Returning to FIG. 5, at block 506, location parameters for the contact search may be retrieved. As similarly discussed with reference to FIG. 5, block 504, the location parameters may be generated in response to the request of block 502 or previously defined and stored on an accessible storage medium. In various implementations, location parameters may refer geographical locations and distances between geographical locations. In various implementations, a location parameter may refer to the geographical location of the user that requested the search. For example, if the user is at a particular street address, the street address may be identified as a location parameter. Moreover, location parameters may also refer to the geographical location of a contact. As previously discussed with reference to shared contact data maintenance method 100, a contact may have an associated contact data record that stores contact data associated with the contact. The contact data record may include a contact data item that stores a business address associated with the contact. In this instance, the address stored in the contact data item may be identified as a geographical parameter. For example, a sales representative may be employed by a particular company. The sales representative may use the street address of the company as his business address. Thus, the street address of the company may be identified as the geographical location of the sales representative and may be identified as a location parameter.

In various implementations, location parameters may include a geographical distance between a contact and the user. For example, if a user of a database service is located at a first street address and a contact is located at a second street address, a location parameter may be the distance between the first street address and the second street address. In various implementations, the distance may be a physical distance described by a standard unit of distance, such as a mile or a kilometer. In some implementations, a distance may be given by a unit of time, such as a minute or an hour. In this instance, the database service provider may use the physical distance that separates the user and the contact in conjunction with established speed limits on roads and any available traffic information to determine the amount of time it may take the user to reach the contact by car, public transportation, or by foot. It will be appreciated that any other measure of distance may be used in accordance with embodiments of the present disclosure.

In various implementations, the location parameters, such as geographical positions and geographical distances, may be determined by a global positioning system (GPS) or a database including a table that stores distance data identifying distances between geographical points. For example, a first computer application used to perform location-based business contact search method 500 may be run on a mobile device, such as a mobile phone. In this example, the computer application may have access to GPS data already present on the mobile phone as a result of ordinary operations associated with the mobile phone, such as verifying a user's location to ensure that a mobile phone service should be delivered to the mobile phone. Moreover, the first computer application may have access to a second computer application installed on the mobile phone that is used to retrieve the GPS data. Thus, the first computer application may be able to retrieve GPS data via access provided by the second computer application. In various implementations, the first computer application may be granted access to the GPS data independent of the second computer application. Thus, the first computer application may retrieve the relevant GPS data, determine the user's location and the contact's location, and determine the distance between the user and the contact.

FIG. 5, at block 508, contacts may be identified based on the location parameters and search parameters. As discussed with reference to FIG. 2, blocks 204 and 206, contact data records may be searched based on a set of parameters. In various implementations, the database service provider may search the contact data records and identify contact data records that satisfy the location parameters and search parameters. A search parameter may be satisfied when a contact data record includes a contact data item storing a value that matches a value identified by a search parameter. The location parameter may be satisfied when the distance between the contact associated with the contact record and the user is less than a designated distance. In various implementations, the user may have identified a maximum distance that the user is willing to travel. Thus, the user may indicate that only contacts within a certain travel radius should be identified. In this instance, the maximum distance and/or travel radius may be the designated distance. The database service provider may use the user's location and the contact's location to determine the distance between them. If the distance is less than the designated distance, the location parameter may be satisfied. If contact record satisfies the search parameters and location parameters, it may be identified and returned as a result of the search.

In various implementations, the contact data is shared contact data. Thus, in various implementations, the database service provider may search crowd sourced contact data that is contributed by multiple entities, such as other users of the database service. As previously discussed with reference to shared contact data maintenance method 100, because the data is crowd sourced and contributed to by multiple entities, a larger amount of data is available to the user. The larger amount of data allows the user to access contact information that the user was previously not aware of. Thus, location-based contact search method 500 may identify additional contacts and sales opportunities of which the user was previously not aware. Furthermore, in various implementations, the user's private contact data may be searched as well. Thus, location-based contact search method 500 may also search the user's private contact data and identify contacts within the user's private contact data that satisfy the location parameters and search parameters.

Returning to FIG. 16, data field 1606 may display location parameters to the user at a user interface. Thus, in various implementations, data field 1606 may display the geographical location of the user, the geographical locations of identified contacts, and the distance between an identified contact and the user. The presentation of this information in the same user interface may allow the user to determine which contacts should be contacted first and how those contacts should be reached. In this example, the location parameters are displayed in a map. The map displays the user's geographical location. In this instance, the user is located in New York. Thus, an icon, such as a circle, representing the user's location is displayed at New York. Furthermore, the map displays the geographical locations of contacts identified by the search. In this instance, icons, such as pins, representing the contacts' geographical locations are displayed on the map. In this instance, the geographical distances between the identified contacts and the user are displayed by their respective locations on the map. By displaying the positions of the user and the identified contacts on the map and displaying the appropriate means of transportation between them, such as freeways, the user may be presented with an indication of distances between the user and the identified contacts.

Returning to FIG. 5, at block 510, a selection from among the identified contacts may be received. The selection of contact data items may be made by the user through a user interface in response to being presented with the contacts identified by the search. In various implementations, the selection may identify specific contacts that the user has chosen as the most relevant to the user's search. For example, location based search method 500 may return relevant contacts within a 100 mile radius of the user. However, the user may only have a few hours available. Thus, the user may select the identified contacts that are closest to the user. As discussed in greater detail below with reference to FIG. 5, block 512, the user may also select identified contacts based on a determination of which contacts the user intends to store within the user's own private contact data.

Figure 17:
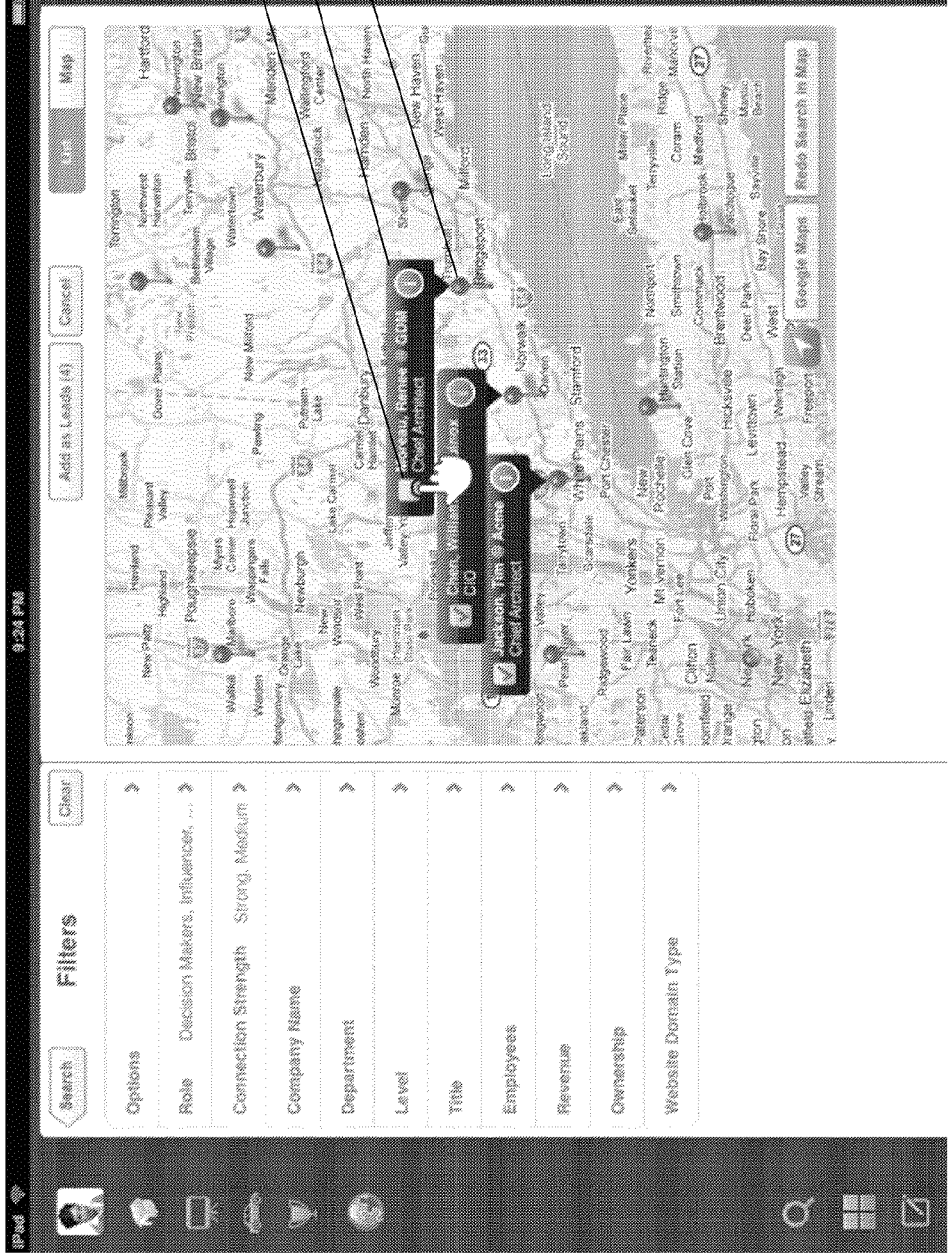
FIG. 17 illustrates an example of an image 1700 of a user interface that may be used to receive a selection from among the identified contacts, in accordance with some implementations.

FIG. 17 illustrates an example of an image 1700 of a user interface that may be used to receive a selection from among the identified contacts, in accordance with some implementations. In various implementations, image 1700 may include data fields 1702, 1704, and 1706. In some implementations, data field 1702 may be an icon, such as a pin, that identifies a particular contact located at a particular geographical location. The utilization of an icon allows a contact data record associated with an identified contact to be represented in the user interface without having to display all contact information stored within the contact data record. Instead, the icon functions as a visual representation of the contact data record that allows multiple contact data records to be displayed simultaneously in the same user interface. In various implementations, data field 1702 may be capable of receiving an input that indicates that the user has requested to view additional contact information associated with the contact identified by data field 1702. In response to data field 1702 receiving the input from the user, data field 1704 may be presented.

In various implementations, data field 1704 may display additional contact information that was not previously displayed by the icon. For example, data field 1704 may expand to display the contact's name, company, and occupational title. Thus, the user may be presented with additional contact information that the user may use to determine whether or not the contact should be communicated with, and whether or not the contact should be stored for future reference. In various implementations, data field 1704 may include data field 1706. Data field 1706 may be capable of receiving an input that indicates that the user has selected the contact identified by data field 1702. If the contact is selected, data field 1706 may display a status indicator that indicates that the contact has been selected. In this instance, a "check mark" may be displayed for contacts that have been selected. If the contact has been selected, the user has indicated that the contact should be stored.

Returning to FIG. 5, at block 512, the selected contacts may be stored. As similarly discussed with reference to FIG. 2, block 212, contact data associated with the selected contacts may be stored locally in the user's computer system. Thus, according to various embodiments, the user may choose to store the contacts in the user's mobile device. When stored locally, the user may access the contacts and associated contact data without a connection, such as a network connection, to the database service provider. Furthermore, according to various implementations, the selected contacts and associated contact data may be stored in a virtual portion of a multi-tenant database. Accordingly, while the user interface may be presented to the user at a local computer system, the contact data may be stored remotely in a multi-tenant database system that is part of a cloud-based on-demand database service environment. In various implementations, the selected contacts and associated contact data may be stored both locally and remotely.

In some implementations, the user may determine what type of record is used to store the selected contacts. As previously discussed with respect to FIG. 1, block 102, a record may be one of several types of record. For example, a record may represent a contact, lead, or account. Thus, according to various implementations, the user may determine whether the selected contacts are stored as contacts, a leads, or as accounts. The user may then provide an input to the database service provider that identifies the type of record the selected contacts should be stored as.

Figure 18:
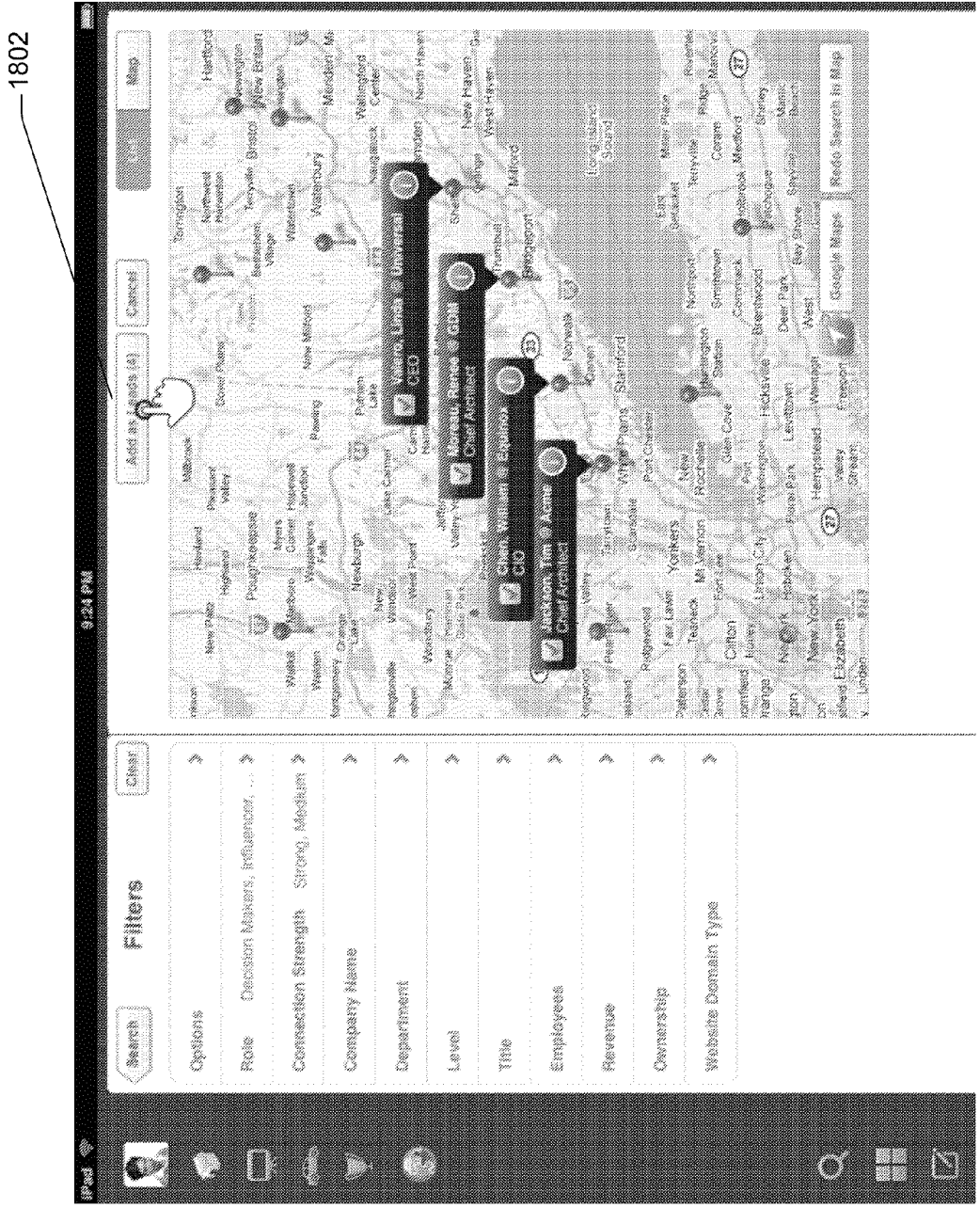
FIG. 18 illustrates an example of an image 1800 of a user interface that may be used to store the selected contacts, in accordance with some implementations.

FIG. 18 illustrates an example of an image 1800 of a user interface that may be used to store the selected contacts, in accordance with some implementations. In various implementations, image 1800 may include data field 1802. In some implementations, data field 1802 may be capable of receiving an input from a user that indicates that selected contacts should be stored. Thus, in response to receiving an input from the user, data field 1802 may indicate to the database service provider that the selected contacts should be stored. Moreover, in this instance, data field 1802 displays the text "Add as Leads (4)." Thus, data field 1802 may be further capable of displaying how many contacts have been selected, and further capable of receiving an input that identifies what type of record the contacts should be stored as. In this instance, the user has indicated that the contacts should be stored as Leads. Thus, data field 1802 may indicate to the database service provider that the contacts should be stored as leads.

Returning to FIG. 5, at block 514, the search parameters and the location parameters for conducting the contact search may be stored. Thus, in various implementations, in addition to storing the selected contacts and associated contact data records, the database service provider may also store the search parameters and location parameters used to identify the selected contacts. As similarly discussed with reference to FIG. 2, block 212, the search parameters and location parameters may be stored locally or remotely. In various implementations, storing the search parameters and location parameters enables subsequent searches to be performed and previous search results to be recreated without the additional determining of parameters. For example, search parameters and location parameters for a particular search may be stored in a record. If the search is to be reproduced or updated, instead of determining search parameters and location parameters as described in FIG. 5, blocks 504 and 506, the record may be retrieved, and the search parameters and location parameters may be retrieved from the record and used to conduct the search. Thus, subsequent searches may be performed faster because fewer parameters need to be determined.

In various implementations, a user of the database service may have access to a search history. Thus, according to some implementations, the stored search parameters and location parameters may be stored in a record that identifies a search history that is accessible by the user. For example, upon initiating a search, the user may access the user's search history and recall a previous search performed with search parameters and location parameters previously entered by the user. The user may then send a request to the database service provider to conduct a location-based search of contact data based on the identified previous search.

Figure 19:
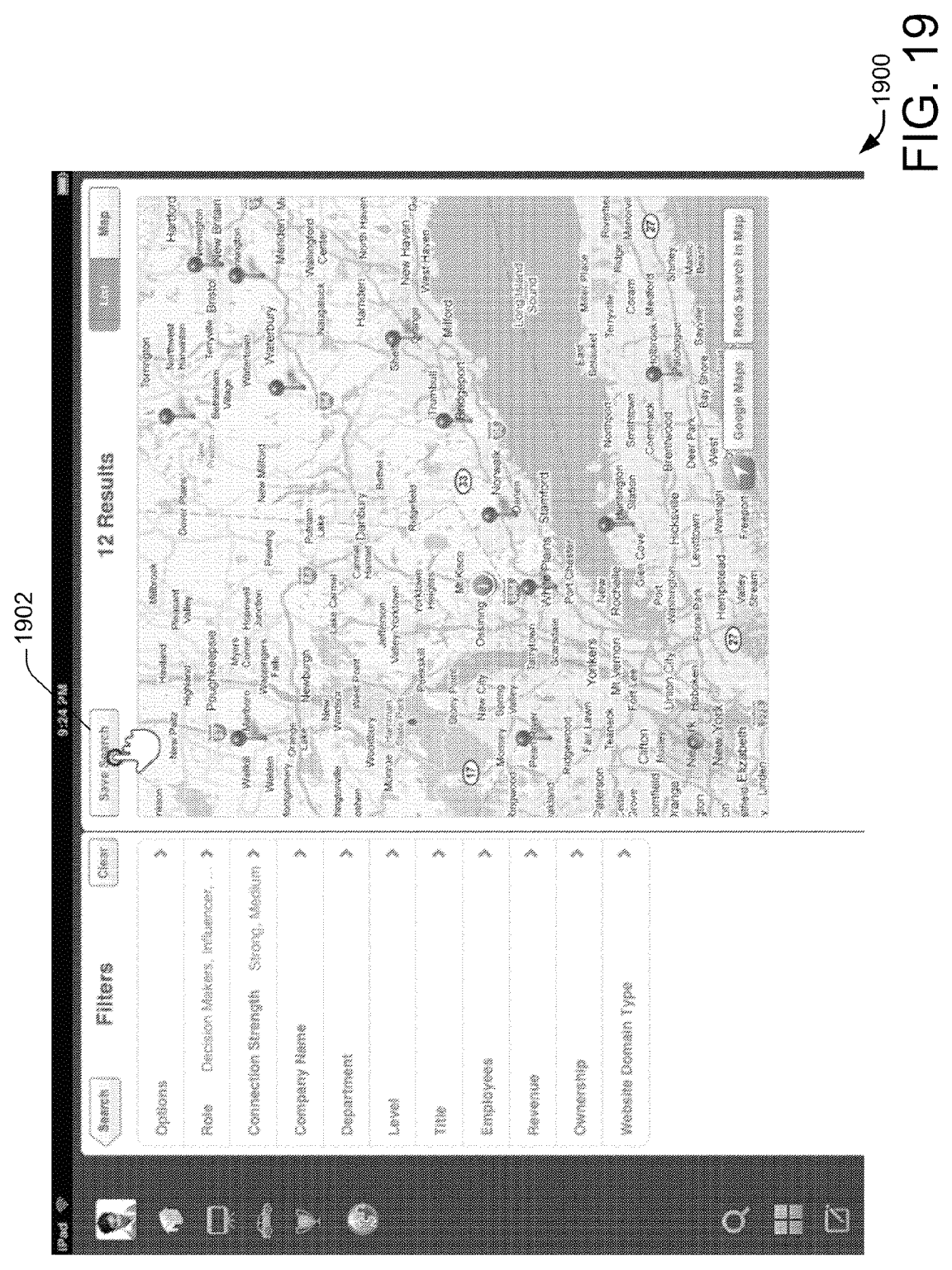

FIG. 19 illustrates an example of an image 1900 of a user interface that may be used to store the search parameters and the location parameters used to conduct location-based contact search method 500, in accordance with some implementations. In various implementations, image 1900 may include data field 1902. In some implementations, data field 1902 may be capable of receiving an input from a user that indicates that the search should be saved. In this instance, data field 1902 displays the text "Save Search." In response to receiving the input from the user, data field 1902 may indicate to the database service provider that the search parameters and location parameters should be saved. In various implementations, saving a search may also indicate that all identified contacts should also be saved. If all identified contacts are also saved, then the contact information associated with all identified contacts may be recalled at a future time.

In some implementations, location-based contact search method 500 may automatically update the results of the search. Thus, according to various implementations, a computer application may periodically refresh the results of the search by periodically conducting subsequent searches of contact data based on the search parameters and location parameters initially provided at the beginning of location-based contact search method 500. When a subsequent search is performed, new contacts may be identified. In various implementations, new contacts may be identified when the user has moved to a different location and new contacts are within the user's travel radius or designated distance. In some implementations, new contacts may be identified when their information is added to the contact data that is searched. In various implementations, the contact data is shared contact data that is crowd sourced among numerous users of the database system, as well as other databases that may store contact information. If another user has contributed contact information for a new contact, the new contact may be identified upon updating the search results returned by location-based contact search method 500.

Furthermore, in various implementations, location-based contact search method 500 may provide notifications to the user that indicate that the search results have been updated. Thus, the user may be notified once new contacts have been identified. In various implementations, the notification may be a message displayed at a user interface of a computer system. In various implementations, the notification indicates that new contacts have been found and the notification identifies how many contacts have found. In various implementations, the notification further identifies the source of the contact data (e.g. shared contact data or private contact data) and identifies which previously-stored search yielded the new contact (e.g. the name of the search). In various implementations, the user may determine various parameters associated with the message, such as how often a notification is sent and where the notification is sent to (e.g. a mobile phone or a computer system).

Figure 20:
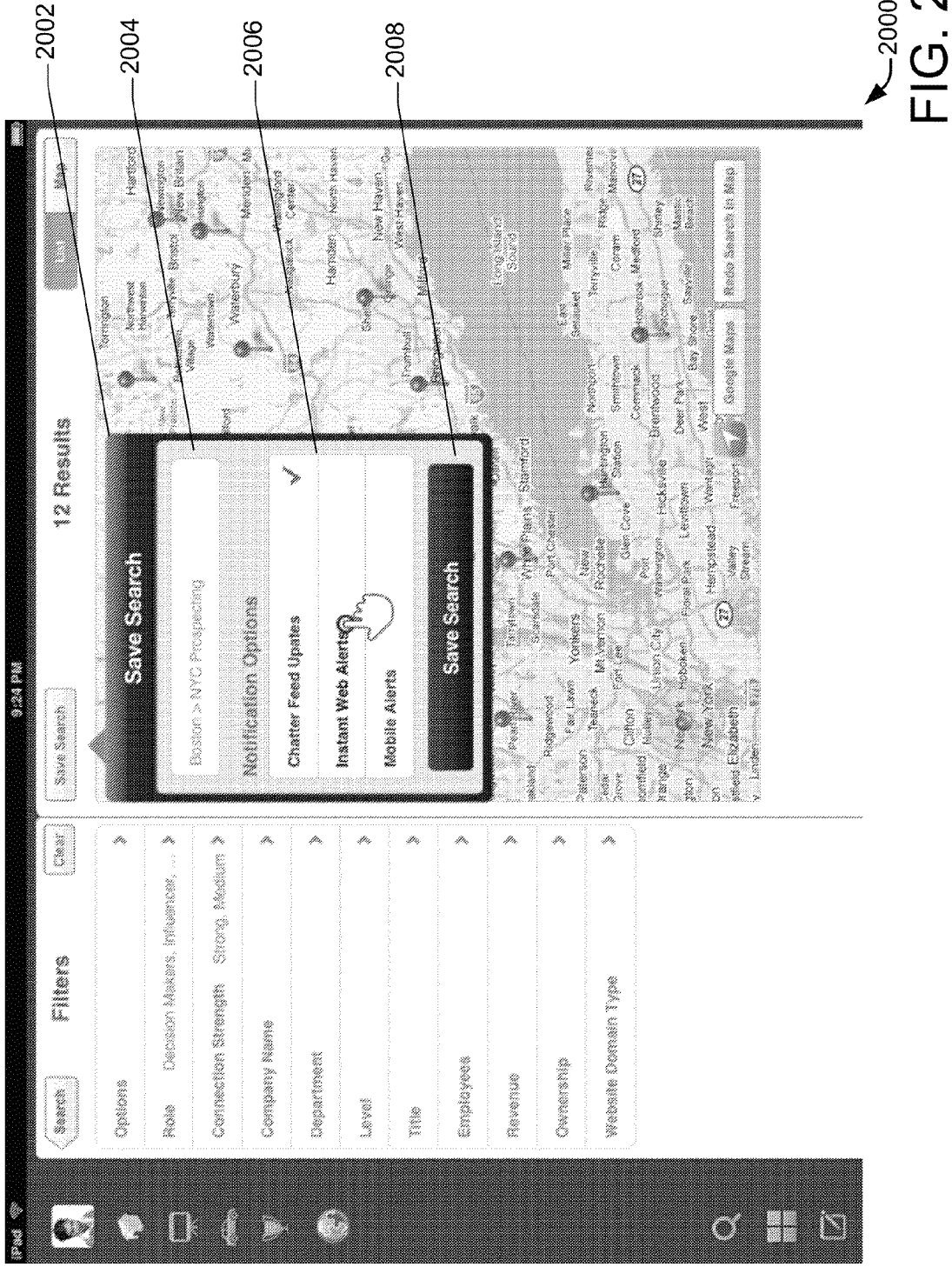
FIG. 20 illustrates an example of an image 2000 of a user interface that may be used to determine how notifications are provided to a user, in accordance with some implementations.

FIG. 20 illustrates an example of an image 2000 of a user interface that may be used to determine how notifications are provided to a user, in accordance with some implementations. In various implementations, image 2000 may include data field 2002. In some implementations, data field 2002 may be presented in response to a user determining that a search should be stored. In various implementations, data field 2002 may include data fields 2004, 2006, and 2008.

In various implementations, data field 2004 may be capable of receiving a data value identifying a name that may be associated with the search to be saved. Thus, according to some embodiments, the user may provide a name for a particular search to be saved. In this instance, the user has chosen the name "Boston>NYC Prospecting" to identify the search to be saved. Thus, the received data value may be associated with and stored in the same record as the search parameters and location parameters.

In some implementations, data field 2006 may be capable of receiving a data value identifying one or more types of notification methods that should be used for new contacts identified in subsequent searches. In this instance, data field 2006 displays the options of "Chatter® Feed Updates," "Instant Web Alerts," and "Mobile Alerts." In various implementations, Chatter® Feed Updates may refer to a social networking service provided by the database service provider Salesforce.com®. Thus, updated results of subsequent searches may be provided to the user via feed updates displayed via the user's Chatter® account. In some embodiments, "Instant Web Alerts" may refer to email messages while "Mobile Alters" may refer to messages sent to a mobile device, such as a mobile phone. In this instance, the user has selected to receive updated search results via Chatter® Feed Updates. In various implementations, the selection may be identified by a status indicator, such as a check mark.

In various implementations, data field 2008 may be capable of receiving an input that indicates that the search should be saved and that notifications for subsequent searches should or should not be provided. Thus, according to various implementations, a user may provide an input to data field 2008 after naming the search and identifying how notifications should be sent to the user. In response to receiving the input, data field 2008 may indicate to the database service provider that the search should be saved and that notifications should be provided in accordance with the selections identified by data field 2006.

Figure 21:
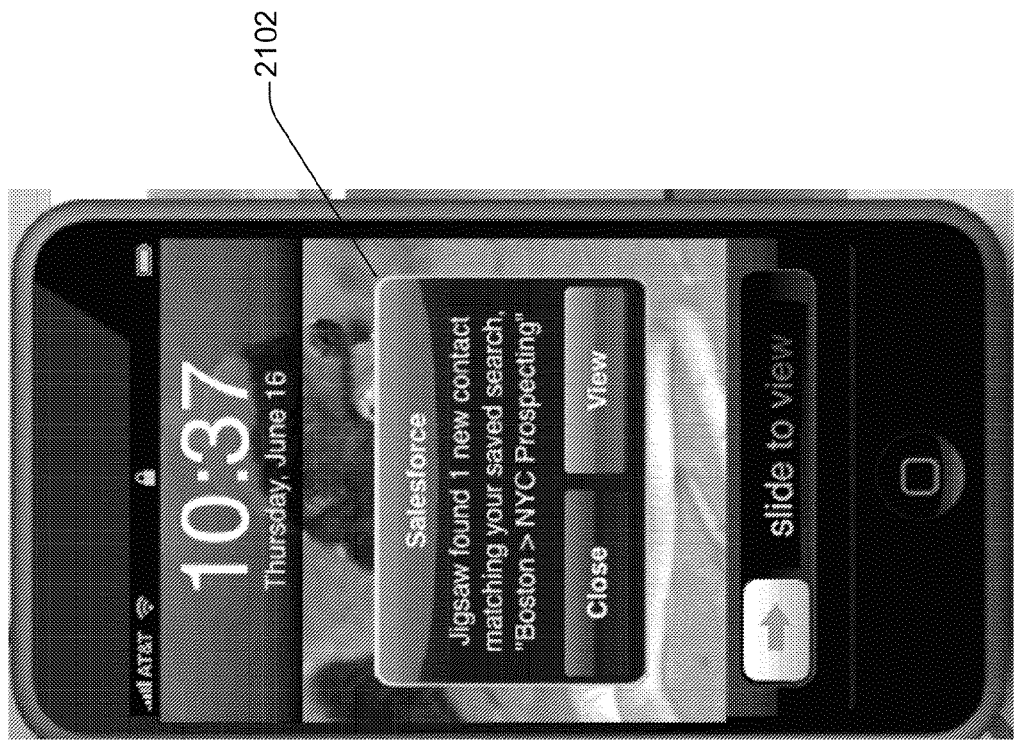
FIG. 21 illustrates an example of an image 2100 of a user interface that may be used to provide a notification to a user, in accordance with some implementations.

FIG. 21 illustrates an example of an image 2100 of a user interface that may be used to provide a notification to a user, in accordance with some implementations. In some implementations, image 2100 may be displayed in a mobile device that is operated by the user. In this instance, the mobile device is the user's mobile phone. In various implementations, image 2100 may include data field 2102. In some implementations, data field 2102 may provide the user with a notification that indicates that a search has been updated. In this instance, data field 2102 indicates that the previously-stored search "Boston>NYC Prospecting" has produced 1 new contact. Moreover, data field 2102 indicates that the contact was identified from shared contact data stored in a virtual portion of a database system operated and maintained by a database service provider as part of a database service named "Jigsaw®."

FIG. 20A shows a system diagram 2000 illustrating architectural components of an on-demand service environment that may be used to implement a contact data unification method, in accordance with some implementations.

A client machine located in the cloud 2004 (or Internet) may communicate with the on-demand service environment via one or more edge routers 2008 and 2012. The edge routers may communicate with one or more core switches 2020 and 2024 via firewall 2016. The core switches may communicate with a load balancer 2028, which may distribute server load over different pods, such as the pods 2040 and 2044. The pods 2040 and 2044, which may each include one or more servers and/or other computing resources, may perform data processing and other operations used to provide on-demand services. Communication with the pods may be conducted via pod switches 2032 and 2036. Components of the on-demand service environment may communicate with a database storage system 2056 via a database firewall 2048 and a database switch 2052.

As shown in FIGS. 20A and 20B, accessing an on-demand service environment may involve communications transmitted among a variety of different hardware and/or software components. Further, the on-demand service environment 2000 is a simplified representation of an actual on-demand service environment. For example, while only one or two devices of each type are shown in FIGS. 20A and 20B, some embodiments of an on-demand service environment may include anywhere from one to many devices of each type. Also, the on-demand service environment need not include each device shown in FIGS. 20A and 20B, or may include additional devices not shown in FIGS. 20A and 20B.

Moreover, one or more of the devices in the on-demand service environment 2000 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 2004 is intended to refer to a data network or plurality of data networks, often including the Internet. Client machines located in the cloud 2004 may communicate with the on-demand service environment to access services provided by the on-demand service environment. For example, client machines may access the on-demand service environment to retrieve, store, edit, and/or process information.

In some embodiments, the edge routers 2008 and 2012 route packets between the cloud 2004 and other components of the on-demand service environment 2000. The edge routers 2008 and 2012 may employ the Border Gateway Protocol (BGP). The BGP is the core routing protocol of the Internet. The edge routers 2008 and 2012 may maintain a table of IP networks or 'prefixes' which designate network reachability among autonomous systems on the Internet.

In one or more embodiments, the firewall 2016 may protect the inner components of the on-demand service environment 2000 from Internet traffic. The firewall 2016 may block, permit, or deny access to the inner components of the on-demand service environment 2000 based upon a set of rules and other criteria. The firewall 2016 may act as one or more of a packet filter, an application gateway, a stateful filter, a proxy server, or any other type of firewall.

In some embodiments, the core switches 2020 and 2024 are high-capacity switches that transfer packets within the on-demand service environment 2000. The core switches 2020 and 2024 may be configured as network bridges that quickly route data between different components within the on-demand service environment. In some embodiments, the use of two or more core switches 2020 and 2024 may provide redundancy and/or reduced latency.

In some embodiments, the pods 2040 and 2044 may perform the core data processing and service functions provided by the on-demand service environment. Each pod may include various types of hardware and/or software computing resources. An example of the pod architecture is discussed in greater detail with reference to FIG. 20B.

In some embodiments, communication between the pods 2040 and 2044 may be conducted via the pod switches 2032 and 2036. The pod switches 2032 and 2036 may facilitate communication between the pods 2040 and 2044 and client machines located in the cloud 2004, for example via core switches 2020 and 2024. Also, the pod switches 2032 and 2036 may facilitate communication between the pods 2040 and 2044 and the database storage 2056.

In some embodiments, the load balancer 2028 may distribute workload between the pods 2040 and 2044. Balancing the on-demand service requests between the pods may assist in improving the use of resources, increasing throughput, reducing response times, and/or reducing overhead. The load balancer 2028 may include multilayer switches to analyze and forward traffic.

In some embodiments, access to the database storage 2056 may be guarded by a database firewall 2048. The database firewall 2048 may act as a computer application firewall operating at the database application layer of a protocol stack. The database firewall 2048 may protect the database storage 2056 from application attacks such as structure query language (SQL) injection, database rootkits, and unauthorized information disclosure.

In some embodiments, the database firewall 2048 may include a host using one or more forms of reverse proxy services to proxy traffic before passing it to a gateway router. The database firewall 2048 may inspect the contents of database traffic and block certain content or database requests. The database firewall 2048 may work on the SQL application level atop the TCP/IP stack, managing applications' connection to the database or SQL management interfaces as well as intercepting and enforcing packets traveling to or from a database network or application interface.

In some embodiments, communication with the database storage system 2056 may be conducted via the database switch 2052. The multi-tenant database system 2056 may include more than one hardware and/or software components for handling database queries. Accordingly, the database switch 2052 may direct database queries transmitted by other components of the on-demand service environment (e.g., the pods 2040 and 2044) to the correct components within the database storage system 2056.

In some embodiments, the database storage system 2056 is an on-demand database system shared by many different organizations. The on-demand database system may employ a multi-tenant approach, a virtualized approach, or any other type of database approach. An on-demand database system is discussed in greater detail with reference to FIGS. 21 and 22.

FIG. 20B shows a system diagram further illustrating architectural components of an on-demand service environment that may be used to implement a contact data unification method, in accordance with some implementations.

In some embodiments, each pod may include a variety of servers and/or other systems. The pod 2044 includes one or more content batch servers 2064, content search servers 2068, query servers 2072, file force servers 2076, access control system (ACS) servers 2080, batch servers 2084, and app servers 2088. Also, the pod 2044 includes database instances 2090, quick file systems (QFS) 2092, and indexers 2094. In one or more embodiments, some or all communication between the servers in the pod 2044 may be transmitted via the switch 2036.

In some embodiments, the application servers 2088 may include a hardware and/or software framework dedicated to the execution of procedures (e.g., programs, routines, scripts) for supporting the construction of applications provided by the on-demand service environment 2000 via the pod 2044. Some such procedures may include operations for providing the services described herein.

The content batch servers 2064 may requests internal to the pod. These requests may be long-running and/or not tied to a particular customer. For example, the content batch servers 2064 may handle requests related to log mining, cleanup work, and maintenance tasks.

The content search servers 2068 may provide query and indexer functions. For example, the functions provided by the content search servers 2068 may allow users to search through content stored in the on-demand service environment.

The Fileforce servers 2076 may manage requests information stored in the Fileforce storage 2078. The Fileforce storage 2078 may store information such as documents, images, and basic large objects (BLOBs). By managing requests for information using the Fileforce servers 2076, the image footprint on the database may be reduced.

The query servers 2072 may be used to retrieve information from one or more file systems. For example, the query system 2072 may receive requests for information from the app servers 2088 and then transmit information queries to the NFS 2096 located outside the pod.

The pod 2044 may share a database instance 2090 configured as a multi-tenant environment in which different organizations share access to the same database. Additionally, services rendered by the pod 2044 may require various hardware and/or software resources. In some embodiments, the ACS servers 2080 may control access to data, hardware resources, or software resources.

In some embodiments, the batch servers 2084 may process batch jobs, which are used to run tasks at specified times. Thus, the batch servers 2084 may transmit instructions to other servers, such as the app servers 2088, to trigger the batch jobs.

In some embodiments, the QFS 2092 may be an open source file system available from Sun Microsystems® of Santa Clara, Calif. The QFS may serve as a rapid-access file system for storing and accessing information available within the pod 2044. The QFS 2092 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 2068 and/or indexers 2094 to identify, retrieve, move, and/or update data stored in the network file systems 2096 and/or other storage systems.

In some embodiments, one or more query servers 2072 may communicate with the NFS 2096 to retrieve and/or update information stored outside of the pod 2044. The NFS 2096 may allow servers located in the pod 2044 to access information to access files over a network in a manner similar to how local storage is accessed.

In some embodiments, queries from the query servers 2022 may be transmitted to the NFS 2096 via the load balancer 2020, which may distribute resource requests over various resources available in the on-demand service environment. The NFS 2096 may also communicate with the QFS 2092 to update the information stored on the NFS 2096 and/or to provide information to the QFS 2092 for use by servers located within the pod 2044.

In some embodiments, the pod may include one or more database instances 2090. The database instance 2090 may transmit information to the QFS 2092. When information is transmitted to the QFS, it may be available for use by servers within the pod 2044 without requiring an additional database call.

In some embodiments, database information may be transmitted to the indexer 2094. Indexer 2094 may provide an index of information available in the database 2090 and/or QFS 2092. The index information may be provided to file force servers 2076 and/or the QFS 2092.

FIG. 21 shows a system diagram 2110 illustrating the architecture of a multitenant database environment, in accordance with some implementations.

Figure 22A:
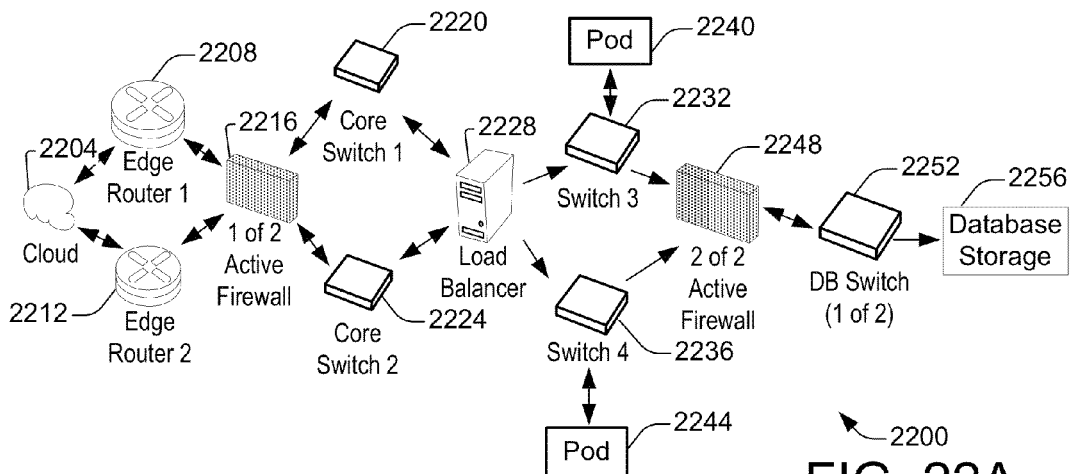
FIG. 22A shows a system diagram 2200 illustrating architectural components of an on-demand service environment that may be used to implement a contact data unification method, in accordance with some implementations.
Figure 22B:
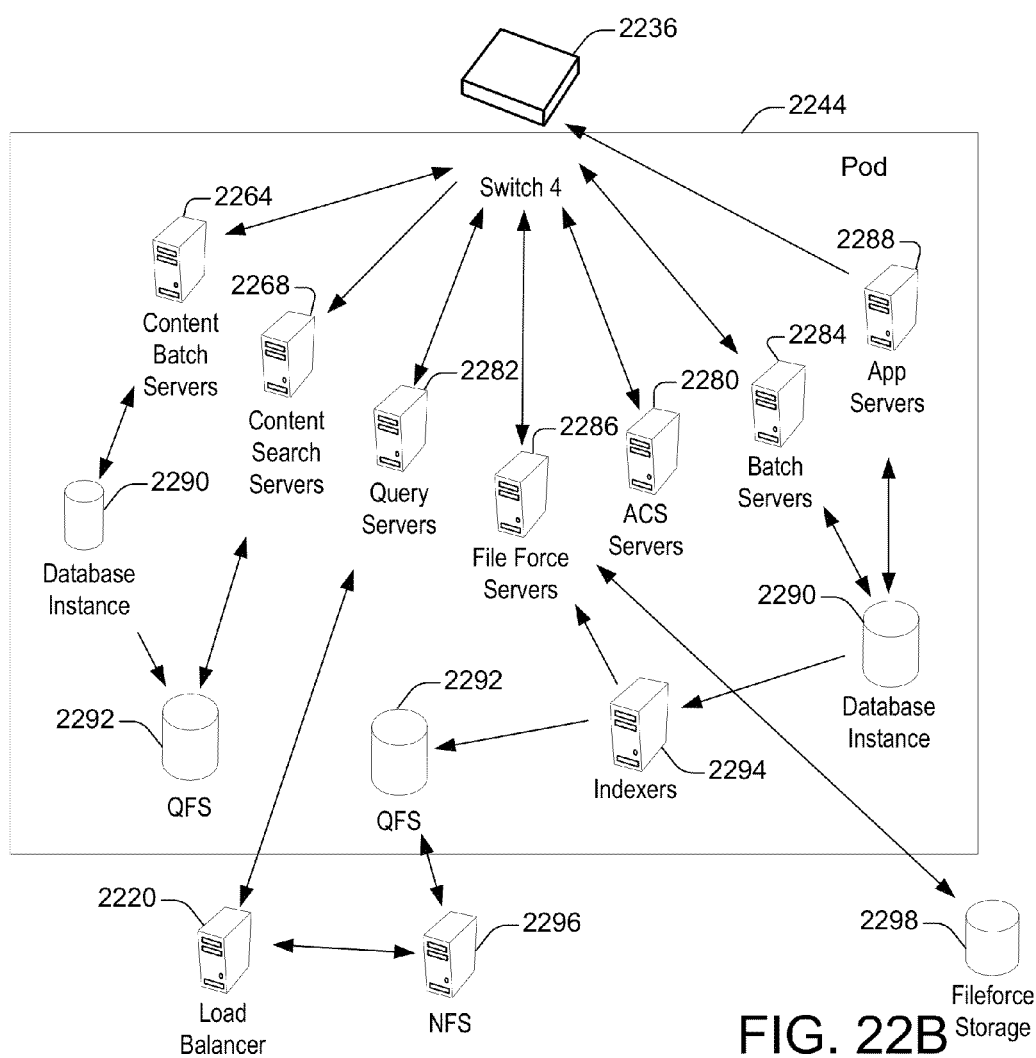
FIG. 22B shows a system diagram further illustrating architectural components of an on-demand service environment that may be used to implement a contact data unification method, in accordance with some implementations.
Figure 23:
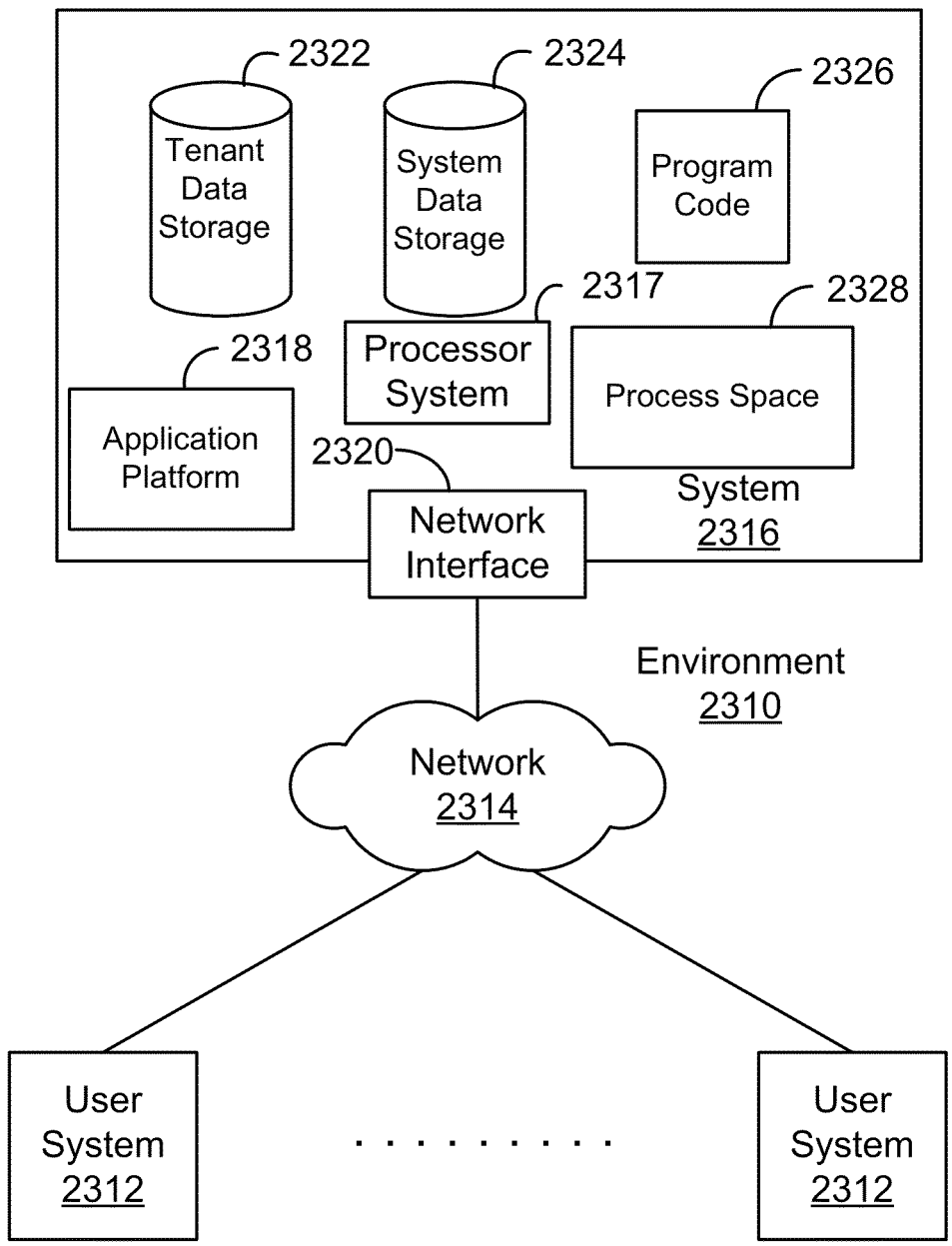
FIG. 23 shows a system diagram 2310 illustrating the architecture of a multitenant database environment, in accordance with some implementations.
Figure 24:
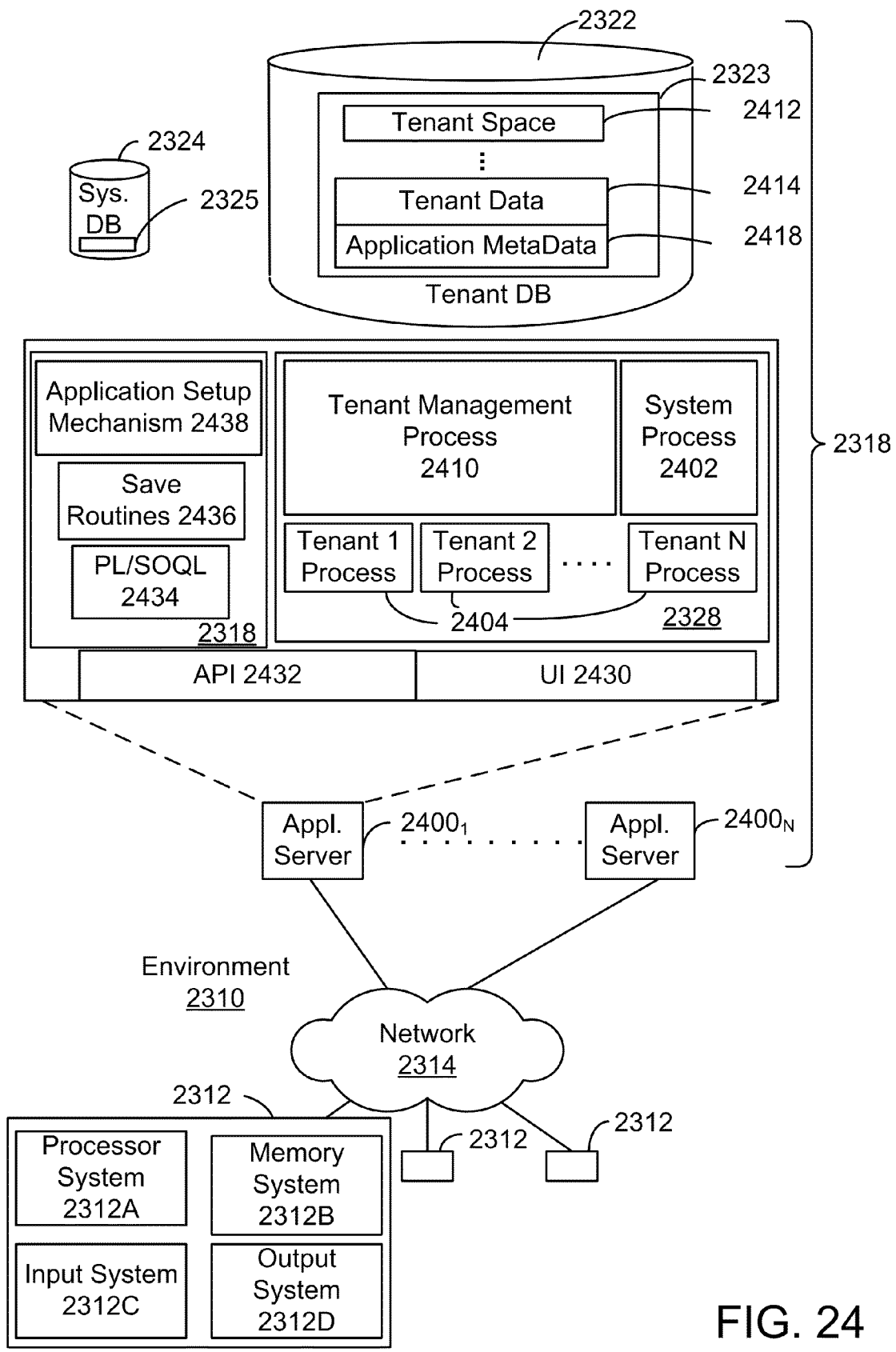
FIG. 24 shows a system diagram 2310 further illustrating the architecture of a multitenant database environment, in accordance with some implementations.

Environment 2110 includes an on-demand database service 2116. User system 2112 may be any machine or system that is used by a user to access a database user system. For example, any of user systems 2112 can be a handheld computing device, a mobile phone, a laptop computer, a work station, and/or a network of computing devices. As illustrated in FIGS. 21 and 22, user systems 2112 might interact via a network 2114 with the on-demand database service 2116.

An on-demand database service, such as system 2116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 2116" and "system 2116" will be used interchangeably herein. A database image may include one or more database objects. A relational database management system (RDBMS) or the equivalent may execute storage and retrieval of information against the database object(s). Application platform 2118 may be a framework that allows the applications of system 2116 to run, such as the hardware and/or software, e.g., the operating system. In an embodiment, on-demand database service 2116 may include an application platform 2118 that enables creation, managing and executing one or more applications developed by the provider of the on-demand database service, users accessing the on-demand database service via user systems 2112, or third party application developers accessing the on-demand database service via user systems 2112.

One arrangement for elements of system 2116 is shown in FIG. 21, including a network interface 2120, application platform 2118, tenant data storage 2122 for tenant data 2123, system data storage 2124 for system data 2125 accessible to system 2116 and possibly multiple tenants, program code 2126 for implementing various functions of system 2116, and a process space 2128 for executing MTS system processes and tenant-specific processes, such as running applications as part of an application hosting service. Additional processes that may execute on system 2116 include database indexing processes.

The users of user systems 2112 may differ in their respective capacities, and the capacity of a particular user system 2112 might be entirely determined by permissions (permission levels) for the current user. For example, where a call center agent is using a particular user system 2112 to interact with system 2116, the user system 2112 has the capacities allotted to that call center agent. However, while an administrator is using that user system to interact with system 2116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 2114 is any network or combination of networks of devices that communicate with one another. For example, network 2114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 2112 might communicate with system 2116 using TCP/IP and, at a higher network level, use other common Internet protocols to communicate, such as HTTP, FTP, AFS, WAP, etc. In an example where HTTP is used, user system 2112 might include an HTTP client commonly referred to as a "browser" for sending and receiving HTTP messages to and from an HTTP server at system 2116. Such an HTTP server might be implemented as the sole network interface between system 2116 and network 2114, but other techniques might be used as well or instead. In some implementations, the interface between system 2116 and network 2114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 2116, shown in FIG. 21, implements a web-based customer relationship management (CRM) system. For example, in one embodiment, system 2116 includes application servers configured to implement and execute CRM software applications as well as provide related data, code, forms, web pages and other information to and from user systems 2112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 2116 implements applications other than, or in addition to, a CRM application. For example, system 2116 may provide tenant access to multiple hosted (standard and custom) applications. User (or third party developer) applications, which may or may not include CRM, may be supported by the application platform 2118, which manages creation, storage of the applications into one or more database objects and executing of the applications in a virtual machine in the process space of the system 2116.

Each user system 2112 could include a desktop personal computer, workstation, laptop, PDA, cell phone, or any wireless access protocol (WAP) enabled device or any other computing device capable of interfacing directly or indirectly to the Internet or other network connection. User system 2112 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 2112 to access, process and view information, pages and applications available to it from system 2116 over network 2114.

Each user system 2112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 2116 or other systems or servers. For example, the user interface device can be used to access data and applications hosted by system 2116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 2112 and all of its components are operator configurable using applications, such as a browser, including computer code run using a central processing unit such as an Intel Pentium® processor or the like. Similarly, system 2116 (and additional instances of an MTS, where more than one is present) and all of their components might be operator configurable using application (s) including computer code to run using a central processing unit such as processor system 2117, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 2116 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one embodiment, each system 2116 is configured to provide web pages, forms, applications, data and media content to user (client) systems 2112 to support the access by user systems 2112 as tenants of system 2116. As such, system 2116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 22 shows a system diagram 2110 further illustrating the architecture of a multitenant database environment, in accordance with some implementations. FIG. 22 shows that user system 2112 may include processor system 2112A, memory system 2112B, input system 2112C, and output system 2112D. FIG. 22 shows network 2114 and system 2116. FIG. 22 also shows that system 2116 may include tenant data storage 2122, tenant data 2123, system data storage 2124, system data 2125, User Interface (UI) 2230, Application Program Interface (API) 2232, PL/SOQL 2234, save routines 2236, application setup mechanism 2238, applications servers 22001-2400N, system process space 2202, tenant process spaces 2204, tenant management process space 2210, tenant storage area 2212, user storage 2214, and application metadata 2216. In other embodiments, environment 2110 may not have the same elements as those listed above and/or may have other elements instead of, or in addition to, those listed above.

User system 2112, network 2114, system 2116, tenant data storage 2122, and system data storage 2124 were discussed above in FIG. 21. Regarding user system 2112, processor system 2112A may be any combination of processors. Memory system 2112B may be any combination of one or more memory devices, short term, and/or long term memory. Input system 2112C may be any combination of input devices, such as keyboards, mice, trackballs, scanners, cameras, and/or interfaces to networks. Output system 2112D may be any combination of output devices, such as monitors, printers, and/or interfaces to networks. As shown by FIG. 22, system 2116 may include a network interface 2120 (of FIG. 21) implemented as a set of HTTP application servers 2200, an application platform 2118, tenant data storage 2122, and system data storage 2124. Also shown is system process space 2202, including individual tenant process spaces 2204 and a tenant management process space 2210. Each application server 2200 may be configured to tenant data storage 2122 and the tenant data 2123 therein, and system data storage 2124 and the system data 2125 therein to serve requests of user systems 2112. The tenant data 2123 might be divided into individual tenant storage areas 2212, which can be either a physical arrangement and/or a logical arrangement of data. Within each tenant storage area 2212, user storage 2214 and application metadata 2216 might be similarly allocated for each user. For example, a copy of a user's most recently used (MRU) items might be stored to user storage 2214. Similarly, a copy of MRU items for an entire organization that is a tenant might be stored to tenant storage area 2212. A UI 2230 provides a user interface and an API 2232 provides an application programmer interface to system 2116 resident processes to users and/or developers at user systems 2112. The tenant data and the system data may be stored in various databases, such as Oracle™ databases.

Application platform 2118 includes an application setup mechanism 2238 that supports application developers' creation and management of applications, which may be saved as metadata into tenant data storage 2122 by save routines 2236 for execution by subscribers as tenant process spaces 2204 managed by tenant management process 2210 for example. Invocations to such applications may be coded using PL/SOQL 34 that provides a programming language style interface extension to API 2232. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 20, 2007, which is hereby incorporated by reference in its entirety and for all purposes. Invocations to applications may be detected by system processes, which manage retrieving application metadata 2216 for the subscriber making the invocation and executing the metadata as an application in a virtual machine.

Each application server 2200 may be communicably coupled to database systems, e.g., having access to system data 2125 and tenant data 2123, via a different network connection. For example, one application server 22001 might be coupled via the network 2114 (e.g., the Internet), another application server 2200N-1 might be coupled via a direct network link, and another application server 2200N might be coupled by yet a different network connection. Transfer Control Protocol and Internet Protocol (TCP/IP) are typical protocols for communicating between application servers 2200 and the database system. However, other transport protocols may be used to optimize the system depending on the network interconnect used.

In certain embodiments, each application server 2200 is configured to handle requests for any user associated with any organization that is a tenant. Because it is desirable to be able to add and remove application servers from the server pool at any time for any reason, there is preferably no server affinity for a user and/or organization to a specific application server 2200. In one embodiment, therefore, an interface system implementing a load balancing function (e.g., an F5 Big-IP load balancer) is communicably coupled between the application servers 2200 and the user systems 2112 to distribute requests to the application servers 2200. In one embodiment, the load balancer uses a least connections algorithm to route user requests to the application servers 2200. Other examples of load balancing algorithms, such as round robin and observed response time, also can be used. For example, in certain embodiments, three consecutive requests from the same user could hit three different application servers 2200, and three requests from different users could hit the same application server 2200. In this manner, system 2116 is multi-tenant, wherein system 2116 handles storage of, and access to, different objects, data and applications across disparate users and organizations.

As an example of storage, one tenant might be a company that employs a sales force where each call center agent uses system 2116 to manage their sales process. Thus, a user might maintain contact data, leads data, customer follow-up data, performance data, goals and progress data, etc., all applicable to that user's personal sales process (e.g., in tenant data storage 2122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 2116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 2116 might also maintain system level data usable by multiple tenants or other data. Such system level data might include industry reports, news, postings, and the like that are sharable among tenants.

In certain embodiments, user systems 2112 (which may be client machines/systems) communicate with application servers 2200 to request and update system-level and tenant-level data from system 2116 that may require sending one or more queries to tenant data storage 2122 and/or system data storage 2124. System 2116 (e.g., an application server 2200 in system 2116) automatically generates one or more SQL statements (e.g., SQL queries) that are designed to access the desired information. System data storage 2124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an embodiment in which a service cloud console is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer implemented method comprising:
    receiving a request to search contact data providing contact information associated with at least one individual, at least a first portion of the contact data including private contact data associated with the at least one individual, at least a second portion of the contact data including shared contact data aggregated and maintained by a provider of a database service, the shared contact data being crowd sourced and provided by a plurality of users of the database service and stored in a virtual portion of a database system, at least a portion of the shared contact data being provided based on a credibility determination indicating a likelihood that the shared contact data is valid, the credibility determination based on a position of one of the users within an organizational hierarchy of an organization, the position of the one user based on an occupational title and at least one designated relationship between occupational titles of users;
    responsive to the request, retrieving search parameters and a first geographical location associated with a source of the request to define a first search;
    performing the first search of the contact data to identify a first contact based on the search parameters and based on the first geographical location, the first contact being identified based at least in part on a geographical distance between the first contact and the first geographical location; and
    generating a geographical representation of the first contact, the geographical representation being a map indicating a geographical location of the first contact on the map, the geographical representation capable of being displayed at a user interface of a computer system.

2. The computer implemented method of claim 1 further comprising:
    identifying a selected contact based on a selection received from a user of the database service, the selection identifying the first contact.

3. The computer implemented method of claim 2 further comprising:
    storing the selected contact in a virtual portion of a database system, the virtual portion of the database system storing private contact data accessible by the user of the database service; and
    storing the search parameters in the virtual portion of the database system.

4. The computer implemented method of claim 1, wherein the search parameters include one or more items selected from the group consisting of: occupational title, occupational industry, department, role, and company name.

5. The computer implemented method of claim 1, wherein the first contact is identified in response to the geographical distance being less than a designated value.

6. The computer implemented method of claim 5, wherein the geographical distance is determined based on a global positioning system.

7. The computer implemented method of claim 1, wherein the source of the request is a user of the database service provided in an on-demand computing service environment.

8. The method of claim 1, further comprising:
    updating the geographical representation by:
        performing a second search of the contact data to identify a second contact based on the search parameters and based on a second geographical location associated with the source of the request;
        updating the geographical representation to display on the map a geographical location of the second contact; and
        generating a notification indicating that the geographical representation has been updated, the notification capable of being displayed at the user interface of the computer system, wherein the second contact was added to the shared contact data of the database service provider by another user at a time after the identification of the first contact.

9. The method of claim 8, wherein the first and second geographical locations are different.

10. A system comprising:
    a database system; and
    one or more computing devices configured to:
        receive a request to search contact data providing contact information associated with at least one individual, at least a first portion of the contact data including private contact data associated with the at least one individual, at least a second portion of the contact data including shared contact data aggregated and maintained by a provider of a database service, the shared contact data being crowd sourced and provided by a plurality of users of the database service and stored in a virtual portion of a database system, at least a portion of the shared contact data being provided based on a credibility determination indicating a likelihood that the shared contact data is valid, the credibility determination based on a position of one of the users within an organizational hierarchy of an organization, the position of the one user based on an occupational title and at least one designated relationship between occupational titles of users;
        responsive to the request, retrieve search parameters and a first geographical location associated with a source of the request to define a first search;
        perform the first search of the contact data to identify a first contact based on the search parameters and based on the first geographical location, the first contact being identified based at least in part on a geographical distance between the first contact and the first geographical location; and
        generate a geographical representation of the first contact, the geographical representation being a map indicating a geographical location of the first contact on the map, the geographical representation capable of being displayed at a user interface of a computer system.

11. The system of claim 10, wherein the one or more computing devices are further configured to:

identify a selected contact based on a selection received from a user of the database service, the selection identifying the first contact.

12. The system of claim 11, wherein the one or more computing devices are further configured to:
store the selected contact in a virtual portion of the database system, the virtual portion of the database system storing private contact data accessible by the user of the database service; and
store the search parameters in the virtual portion of the database system.

13. The system of claim 10, wherein the search parameters include one or more items selected from the group consisting of: occupational title, occupational industry, department, role, and company name.

14. The system of claim 10, wherein the first contact is identified in response to the geographical distance being less than a designated value.

15. The system of claim 14, wherein the geographical distance is determined based on a global positioning system.

16. The system of claim 10, wherein the source of the request is a user of the database service provided in an on-demand computing service environment.

17. The system of claim 10, the one or more computing devices further configured to:
update the geographical representation by:
performing a second search of the contact data to identify a second contact based on the search parameters and based on a second geographical location associated with the source of the request;
updating the geographical representation to display on the map a geographical location of the second contact; and
generating a notification indicating that the geographical representation has been updated, the notification capable of being displayed at the user interface of the computer system, wherein the second contact was added to the shared contact data of the database service provider by another user at a time after the identification of the first contact.

18. The system of claim 17, wherein the first and second geographical locations are different.

19. One or more non-transitory computer-readable storage media having instructions stored therein, the instructions configured to cause a method to be performed, the method comprising:
receiving a request to search contact data providing contact information associated with at least one individual, at least a first portion of the contact data including private contact data associated with the at least one individual, at least a second portion of the contact data including shared contact data aggregated and maintained by a provider of a database service, the shared contact data being crowd sourced and provided by a plurality of users of the database service and stored in a virtual portion of a database system, at least a portion of the shared contact data being provided based on a credibility determination indicating a likelihood that the shared contact data is valid, the credibility determination based on a position of one of the users within an organizational hierarchy of an organization, the position of the one user based on an occupational title and at least one designated relationship between occupational titles of users;
responsive to the request, retrieving search parameters and a first geographical location associated with a source of the request to define a first search;
performing the first search of the contact data to identify a first contact based on the search parameters and based on the first geographical location, the first contact being identified based at least in part on a geographical distance between the first contact and the first geographical location; and
generating a geographical representation of the first contact, the geographical representation being a map indicating a geographical location of the first contact on the map, the geographical representation capable of being displayed at a user interface of a computer system.

20. The one or more non-transitory computer-readable storage media of claim 19 further comprising:
identifying a selected contact based on a selection received from a user of the database service, the selection identifying the first contact.

21. The one or more non-transitory computer-readable storage media of claim 20 further comprising:
storing the selected contact in a virtual portion of a database system, the virtual portion of the database system storing private contact data accessible by the user of the database service; and
storing the search parameters in the virtual portion of the database system.

22. The one or more non-transitory computer-readable storage media of claim 19, wherein the first contact is identified in response to the geographical distance being less than a designated value.

23. The one or more non-transitory computer-readable storage media of claim 19, the method further comprising:
updating the geographical representation by:
performing a second search of the contact data to identify a second contact based on the search parameters and based on a second geographical location associated with the source of the request;
updating the geographical representation to display on the map a geographical location of the second contact; and
generating a notification indicating that the geographical representation has been updated, the notification capable of being displayed at the user interface of the computer system, wherein the second contact was added to the shared contact data of the database service provider by another user at a time after the identification of the first contact.

24. The one or more non-transitory computer-readable storage media of claim 23, wherein the first and second geographical locations are different.

* * * * *